US009571342B2

(12) United States Patent
Chao et al.

(10) Patent No.: US 9,571,342 B2
(45) Date of Patent: Feb. 14, 2017

(54) METHOD AND SYSTEM FOR GENERATING TRANSACTION DATA FROM NETWORK TRAFFIC DATA FOR AN APPLICATION SYSTEM

(75) Inventors: Wilson Wai Hang Chao, Burnaby (CA); Angus Richard Telfer, Vancouver (CA); Loki Jorgenson, Vancouver (CA)

(73) Assignee: INETCO SYSTEMS LIMITED, Burnaby (CA)

( * ) Notice: Subject to any disclaimer, the term of this patent is extended or adjusted under 35 U.S.C. 154(b) by 622 days.

(21) Appl. No.: 13/396,003

(22) Filed: Feb. 14, 2012

(65) Prior Publication Data

US 2013/0212255 A1    Aug. 15, 2013

(51) Int. Cl.
*G06F 15/173* (2006.01)
*H04L 12/24* (2006.01)
(Continued)

(52) U.S. Cl.
CPC ......... *H04L 41/083* (2013.01); *G06F 17/2785* (2013.01); *H04L 67/22* (2013.01);
(Continued)

(58) Field of Classification Search
CPC ........ G06Q 10/06; G06Q 11/00; G06Q 11/30; G06Q 11/34; G06Q 11/3409; G06Q 11/3466; G06Q 11/36
(Continued)

(56) References Cited

U.S. PATENT DOCUMENTS 5,987,442 A    11/1999 Lewis et al.
7,051,339 B2    5/2006 Deverill et al.
(Continued)

FOREIGN PATENT DOCUMENTS

EP    1465368 A1    10/2004
EP    2254286 A1    11/2010
WO    WO 2010/008685 A2    1/2010

OTHER PUBLICATIONS

"How It Works," Jan. 10, 2012, ExtraHop.com, available at https://web.archive.org/web/20120110074659/http://www.extrahop.com/products/how-extrahop-works/.*
(Continued)

*Primary Examiner* — Tauqir Hussain
*Assistant Examiner* — Austin Moreau
(74) *Attorney, Agent, or Firm* — Conneely PC; Joseph Conneely

(57) ABSTRACT

A method for generating transaction data from network traffic data for an application system which is distributed across a plurality of network connected nodes, comprising: gathering the network traffic data, the network traffic data including syntactic information; storing the network traffic data and the syntactic information in field-sets; deriving semantic information from the network traffic data and the syntactic information with a first module which implements a first semantic model relating to first transactions, and modifying the field-sets to include the semantic information; passing the field-sets to a second module; deriving additional semantic information from the network traffic data, the syntactic information, and the semantic information with the second module which implements a second semantic model relating to second transactions, and further modifying the field-sets to include the additional semantic information; and, outputting the field-sets from the second module to provide the transaction data for the application system.

22 Claims, 13 Drawing Sheets

(51) Int. Cl.
    *H04L 29/08* (2006.01)
    *G06F 17/27* (2006.01)
    *H04L 12/26* (2006.01)
(52) U.S. Cl.
    CPC ............ *H04L 43/028* (2013.01); *H04L 43/04* (2013.01); *H04L 43/10* (2013.01)
(58) Field of Classification Search
    USPC ........................................................ 709/224
    See application file for complete search history.

(56) References Cited

U.S. PATENT DOCUMENTS

| | | | |
|---|---|---|---|
| 7,065,482 B2 | 6/2006 | Shorey et al. | |
| 7,290,048 B1* | 10/2007 | Barnett | G06F 11/3495 709/223 |
| 7,290,056 B1 | 10/2007 | McLaughlin, Jr. | |
| 7,457,728 B2 | 11/2008 | Chen et al. | |
| 7,743,150 B1 | 6/2010 | Carter et al. | |
| 7,778,194 B1 | 8/2010 | Yung | |
| 7,870,431 B2 | 1/2011 | Cirne et al. | |
| 7,930,396 B2* | 4/2011 | Trinon et al. | 709/224 |
| 9,007,374 B1* | 4/2015 | Buchholz | G06T 7/408 345/428 |
| 2002/0174216 A1 | 11/2002 | Storey et al. | |
| 2007/0255529 A1 | 11/2007 | Biazetti et al. | |
| 2008/0189352 A1 | 8/2008 | Mitchell et al. | |
| 2008/0235366 A1 | 9/2008 | Telfer et al. | |
| 2009/0059793 A1 | 3/2009 | Greenberg | |
| 2010/0070981 A1 | 3/2010 | Hadar et al. | |
| 2010/0185760 A1 | 7/2010 | Nakahira | |
| 2011/0016207 A1* | 1/2011 | Goulet et al. | 709/224 |
| 2011/0029657 A1* | 2/2011 | Gueta et al. | 709/224 |
| 2011/0087854 A1 | 4/2011 | Rushworth et al. | |
| 2011/0299389 A1 | 12/2011 | Mau et al. | |
| 2012/0191716 A1 | 7/2012 | Omoigui | |
| 2013/0019008 A1 | 1/2013 | Jorgenson et al. | |

OTHER PUBLICATIONS

U.S. Appl. No. 13/184,274, Jorgenson et al.
Abadi, et al., "Aurora: A New Model and Architecture for Data Stream Management", The VLDB Journal, 2003.
International Search Report and Written Opinion mailed May 8, 2013 for Corresponding International Patent Application No. PCT/CA2013/000095.
Extended European Search Report dated Sep. 11, 2015 issued by the European Patent Office for corresponding European Patent Application No. 13748880.5.
Loki Jorgenson, "The Unified Transaction Model (UTM)", Dec. 17, 2011, XP055210801, Retrieved from the Internet: URL:https://www.inetco.com/blog/2011/12/the-unified-transaction-model-utm/ [retrieved on Sep. 2, 2015].
Ulf Lamping et al, Wireshark User's Guide for Wireshark 1.7, Internet Citation, Jul. 5, 2011, pp. I-X, XP-002694937, Retrieved from the Internet: URL:http//web.archive.org/web/2011070502137/http://www.wireshark.org/download/docs/user-guide-a4.pdf [retrieved on Apr. 8, 2013].
Paramvir Bahl et al, "Towards Highly Reliable Enterprise Network Services via Inference of Multi-Level Dependencies", ACM SIGCOMM Computer Communication Review, vol. 37, No. 4, Oct. 1, 2007, p. 13, XP055153999, ISSN: 0146-4833, DOI: 10.1145/1282427.1282383.

* cited by examiner

METHOD AND SYSTEM FOR GENERATING TRANSACTION DATA FROM NETWORK TRAFFIC DATA FOR AN APPLICATION SYSTEM

FIELD OF THE INVENTION

This invention relates to the field of network message monitoring, and more specifically, to a method and system for generating transaction data from network traffic data for an application system which is distributed across a plurality of network connected nodes.

BACKGROUND OF THE INVENTION

Many businesses and organizations use complex, network distributed applications. These applications may be employed as part of the internal operation of the business, as a product or service offered to customers, or as part of a larger system involving other businesses and organizations. Distributed applications often have complex topologies that include remote data-centers, third party services, cloud-based components, mobile and Web-based interfaces, and globalized infrastructure. These applications often have multiple distinct functional tiers, implement a range of different protocols, and use hardware and software from a variety of different vendors.

In order to manage and maintain complex distributed applications, different strategies have been employed. According to one strategy, network communications between nodes are monitored. Exchanges of data and/or messages characterize the individual nodes and their relationship to each other.

Depending on the type of application, a particular exchange of data may correspond to the execution of a particular task. Such an exchange of data may be identified as a type of transaction. Monitoring and analyzing the transactions between nodes provides critical information about the operation and performance of the individual nodes and of the overall distributed application.

One method of monitoring inter-node communications involves sending a copy of all related network traffic to an analysis system. For example, network traffic may be monitored by connecting an analysis system to a "mirror port" of a network switch. A mirror port is a special interface to which the switch sends a copy of every packet passing through the other interfaces of the switch. An analysis system may be connected to the mirror ports on multiple switches in order to acquire copies of all network packets that are transmitted in the operation of the monitored application.

The analysis system may operate off-line on a recorded trace of network packets or it may process the packets in real-time as they arrive. The analysis system processes network packets to extract the application messages that were sent between nodes. The application messages are further analyzed to determine the type and nature of transactions that were executed between individual nodes. Transactions between nodes may be further analyzed to associate them with transactions between other nodes. In a further analysis, transactions may be associated with actions of an end-user of the application and with the business processes that they are intended to support.

For example, a basic transaction between two individual nodes may correspond to the update of data within a database. A set of similar transactions may correspond to an end-user making changes to personal data maintained by an application. Several sets of transactions may correspond to the end-user managing a bank account including updating personal data, transferring money, and paying bills. The analysis system decodes network data, extracts the messages, constructs individual transactions, and successively groups them together and characterizes them with respect to application design and established business processes. The results of these analyses are presented to a user of the analysis system so that they may be viewed and measured. From this information, a user such as an application manager or customer support technician may determine the overall behaviour of the application with respect to a business process in order to confirm correct operation, diagnose problems, or optimize performance. As well, individual transactions corresponding to specific incidents or customer actions may be isolated and inspected.

Networks and applications are implemented using various well-known protocols, conventions, and programming patterns. However, the inter-play between the application components, the underlying network, and the software and hardware environments leads to complexities in application behaviour. These behaviours are often not fully anticipated by the mechanics of the implemented protocols or by the application designers. One shortcoming of existing analysis systems is that their simple rule-based analysis of network traffic is often not sufficient to accurately and consistently identify and correlate transactions in modern distributed applications. Rather, semantic analysis, using domain knowledge, is required to effectively monitor business transactions. Efficient means are required to implement the necessary models to analyze network traffic using semantic analysis. Such means are often lacking in existing systems.

For a transaction monitoring system to operate in real-time on network traffic from a large distributed application, very high volumes of network data must be processed. Real-time analysis must efficiently operate on the network data without losing information, generating incorrect or incomplete results, exceeding the capacity of the resources being used for monitoring, or impacting the application that is being monitored. Efficient mechanisms are required for data monitoring, recording, analysis, storage and retrieval. Again, such mechanisms are often lacking in existing systems.

In general, real-time analysis systems are designed to minimize bottlenecks and optimize the use of resources to satisfy specific temporal constraints. In the case of transaction monitoring, network traffic must be successfully assembled into transactions at a rate higher than new network data arrives in order to avoid losing yet-unprocessed data or exceeding data buffer limitations. Existing database storage mechanisms are not sufficiently time-efficient to support high volumes of data for processing by a real-time system. Conversely, centralized data processing that requires data to be moved from storage to a processing engine for analysis creates a bottleneck. Further, analyzing all data without pre-processing, partitioning and filtering is highly inefficient. As such, existing methods and systems for real-time transaction monitoring based upon network traffic are not efficient enough to meet modern needs.

A need therefore exists for an improved method and system for generating transaction data from network traffic data for an application system which is distributed across a plurality of network connected nodes. Accordingly, a solution that addresses, at least in part, the above and other shortcomings is desired.

SUMMARY OF THE INVENTION

According to one aspect of the invention, there is provided a method for generating transaction data from network traffic data for an application system which is distributed across a plurality of network connected nodes, comprising: gathering the network traffic data from network traffic passing between the plurality of network connected nodes of the application system, the network traffic data including syntactic information; storing the network traffic data and the syntactic information in field-sets; deriving semantic information from the network traffic data and the syntactic information in the field-sets with a first module which implements a first semantic model relating to first transactions within the application system having a first granularity, and modifying the field-sets to include the semantic information; passing the field-sets to a second module; deriving additional semantic information from the network traffic data, the syntactic information, and the semantic information in the field-sets with the second module which implements a second semantic model relating to second transactions within the application system having a second granularity, the second granularity being coarser than the first granularity, and further modifying the field-sets to include the additional semantic information; and, outputting the field-sets from the second module to provide the transaction data for the application system; wherein the syntactic information pertains to form and content of the network traffic data and wherein the semantic information and the additional semantic information pertain to meaning and context of the network traffic data and the syntactic information in relation to the network traffic and the application system.

In accordance with further aspects of the present invention there is provided an apparatus such as a data processing system, a method for adapting these, as well as articles of manufacture such as a computer readable medium or product and computer program product having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain software, circuits, structures and methods have not been described or shown in detail in order not to obscure the invention. The term "data processing system" is used herein to refer to any machine for processing data, including the computer systems, wireless devices, and network arrangements described herein. The term "operation" is used herein to refer to a processing step in a sequence of processing steps specific to an analysis. The term "module" is used herein to refer to a self-contained software or hardware unit which itself offers a specific service and may be linked to other such units to form a more complex system. The term "stage" is used herein to refer to one or more sequences of operations particular to one or more models that perform a specific type of analysis and processing, e.g., TCP decode and segment assembly. The term "sub-stage" is used herein to refer to a sequence of operations within a stage that typically corresponds to a single model or analytic process and forms part or all of a stage. The term "layer" is used herein to refer to a set of one or more stages, in parallel or in series, that consumes data of a given type and generates data of a subsequent type (e.g., the network layer of a Unified Transaction Model ("UTM") hierarchy 100 as described below), consuming traffic data and generating link transactions and application messages. The term "semantic" is used herein to refer to items having to do with meaning and understanding, typically as related to symbols or representations, such as in language or data. The term "domain knowledge model" (or "semantic model") is used herein to refer to a collection of machine-interpretable representations pertaining to a specific area of knowledge where the representations are of sets of concepts and the relationships between those concepts, expressed in terms of meaning ascribed by a user within that area. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware or in a combination of hardware and software.

Figure 1:
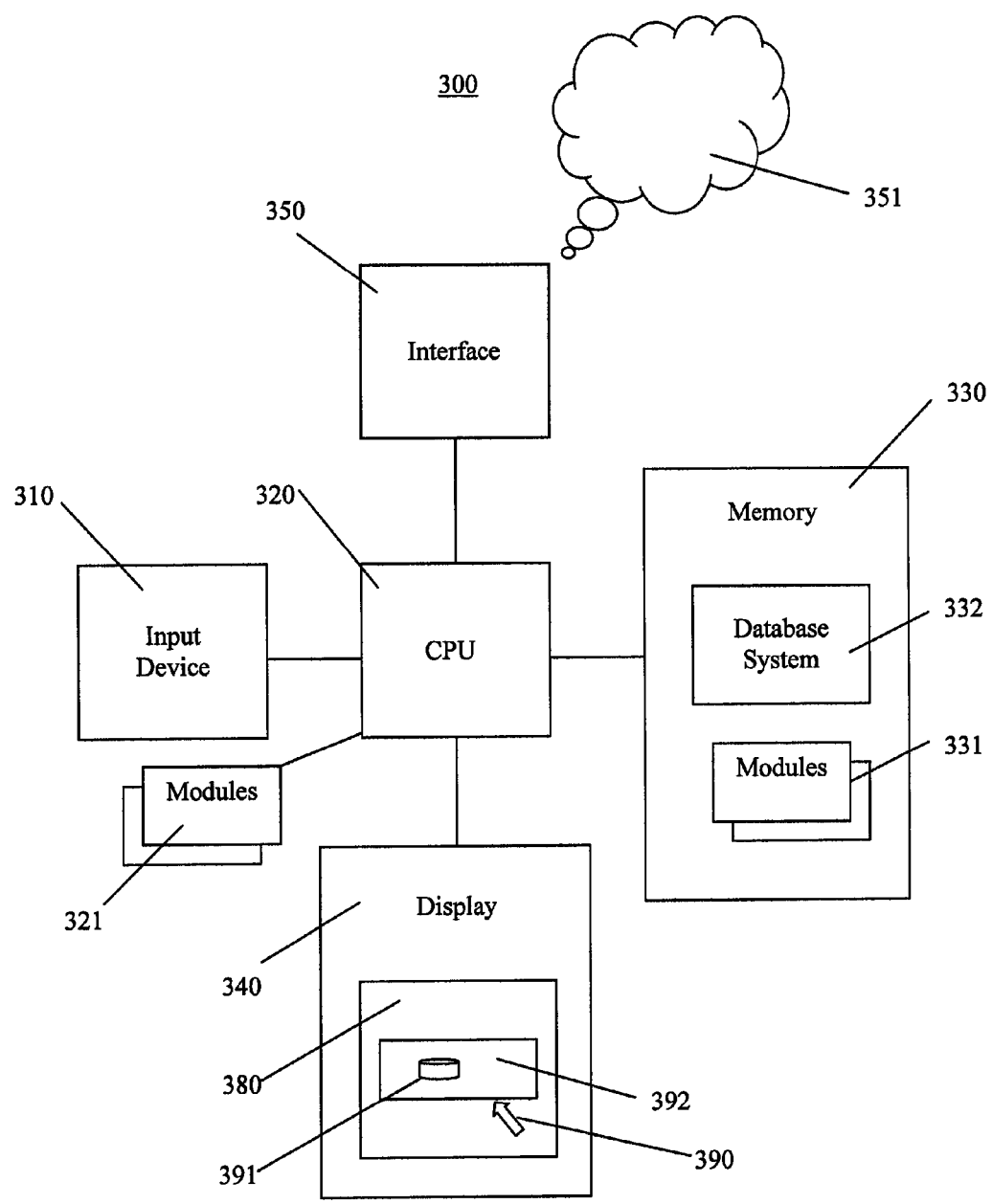
FIG. 1 is a block diagram illustrating a data processing system in accordance with an embodiment of the invention.

FIG. 1 is a block diagram illustrating a data processing system 300 in accordance with an embodiment of the invention. The data processing system 300 is suitable for network message monitoring and analysis, business transaction monitoring and analysis, and for generating, displaying, and adjusting presentations in conjunction with a graphical user interface ("GUI"), as described below. The data processing system 300 may be a client and/or server in a client/server system (e.g., 400). For example, the data processing system 300 may be a server system or a personal computer ("PC") system. The data processing system 300 may also be a mobile device or other wireless, portable, or handheld device. The data processing system 300 may also be a distributed system which is deployed across multiple processors. The data processing system 300 may also be a virtual machine. The data processing system 300 includes an input device 310, at least one central processing unit ("CPU") 320, memory 330, a display 340, and an interface device 350. The input device 310 may include a keyboard, a mouse, a trackball, a touch sensitive surface or screen, a position tracking device, an eye tracking device, or a similar device. The display 340 may include a computer screen, television screen, display screen, terminal device, a touch sensitive display surface or screen, or a hardcopy producing output device such as a printer or plotter. The memory 330 may include a variety of storage devices including internal memory and external mass storage typically arranged in a hierarchy of storage as understood by those skilled in the art. For example, the memory 330 may include databases, random access memory ("RAM"), read-only memory ("ROM"), flash memory, and/or disk devices. The interface device 350 may include one or more network connections. The data processing system 300 may be adapted for communicating with other data processing systems (e.g., similar to data processing system 300) over a network 351 via the interface device 350. For example, the interface device 350 may include an interface to a network 351 such as the Internet and/or another wired or wireless network (e.g., a wireless local area network ("WLAN"), a cellular telephone network, etc.). As such, the interface 350 may include suitable transmitters, receivers, antennae, etc. Thus, the data processing system 300 may be linked to other data processing systems by the network 351. The CPU 320 may include or be operatively coupled to dedicated coprocessors, memory devices, or other hardware modules 321. The CPU 320 is operatively coupled to the memory 330 which stores an operating system (e.g., 331) for general management of the system 300. The CPU 320 is operatively coupled to the input device 310 for receiving user commands or queries and for displaying the results of these commands or queries to the user on the display 340. Commands and queries may also be received via the interface device 350 and results may be transmitted via the interface device 350. The data processing system 300 may include a database system 332 (or datastore 360) for storing data and programming information. The database system 332 may include a database management system and a database (e.g., 380) and may be stored in the memory 330 of the data processing system 300. In general, the data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more hardware modules 321 or software modules 331 resident in the memory 330 of the data processing system 300 or elsewhere (e.g., 320). Alternatively, the programmed instructions may be embodied on a computer readable medium (or product) (e.g., a compact disk ("CD"), a floppy disk, etc.) which may be used for transporting the programmed instructions to the memory 330 of the data processing system 300. Alternatively, the programmed instructions may be embedded in a computer-readable signal or signal-bearing medium (or product) that is uploaded to a network 351 by a vendor or supplier of the programmed instructions, and this signal or signal-bearing medium may be downloaded through an interface (e.g., 350) to the data processing system 300 from the network 351 by end users or potential buyers.

A user may interact with the data processing system 300 and its hardware and software modules 321, 331 using a graphical user interface ("GUI") 380. The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input device 310 such as a mouse. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input device (e.g., a mouse) 310 to position a pointer or cursor 390 over an object (e.g., an icon) 391 and by selecting or "clicking" on the object 391. Typically, a GUI based system presents application, system status, and other information to the user in one or more "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

According to one embodiment of the invention, transactions are specific exchanges of data, resources, or messages that represent a finite interaction between two or more entities based on either formal or implicit rules. A transaction may take place between two or more people, between a person and a business, between businesses, between two or more applications, or between two or more network interfaces. The rules and means of interaction vary with the types of entities involved, with the implementation, and the circumstances. Some transactions may be considered "atomic", that is, they are composed of simple indivisible actions. However, in many cases, types of transactions may be defined as comprising sub-transactions of other types. There may be a well-defined hierarchy of transaction types in cases where distinct layers of interaction are identified, each with its own governing rules and models of behaviour. Transactions between applications across a network connection may be defined by such a hierarchy. At the lowest levels, the layers of interaction may follow the OSI Layer Model which defines interactions at seven distinct strata including network, transport, sessions, and application. Interaction at each layer may be described and governed by the implementation of a protocol and by its behaviour under a range of circumstances.

According to one embodiment, a method and system is provided for modeling transactions at four specific levels as defined by a Unified Transaction Model ("UTM") hierarchy 100 (described below), namely, at the network, services, applications, and business layers. More or fewer layers may be defined as appropriate. At each defined layer, one or more models are constructed that account for interactions at that layer. For example, the IEEE standards for IP and TCP provide a basis for modeling and analyzing network and transport behaviours respectively of network traffic data. Subsequently, IP packets may be passively monitored on a TCP/IP network and analyzed using these models. Packets that are associated with a particular exchange of messages between two applications can be selected out. A set of IP packets that correspond to the negotiated exchange of a single application message may be defined as a "network transaction". From this set of packets, the application message may be extracted and assembled.

Types of transactions may be defined that are specific to each layer. For example, a specific set of application messages exchanged between two applications may be associated according to an application-layer model. This set corresponds to a certain exchange of data between applications and may be defined as a "service transaction". Additional models and analyses can subsequently construct further transactions types at higher layers such as "application transactions" and "business transactions".

Each model that is employed by the method and system of the present invention may be instantiated by one or more modules (e.g., 505, 510, 331). Each module represents a basic function required by the model. The modules are pipelined together such that they pass data from one to the next continuously and in real-time. Individual datasets are passed between the modules that correspond to events or objects being processed.

According to one embodiment, the datasets are composed of field-value pairs. In this case, the datasets are referred to as "field-sets" 301 and the field-value pairs as "field members" 302. At any given point, the field-sets contain data yet to be analyzed as well as the results from analyses conducted by previous modules. As each module performs its function, zero or more field members may be generated, modified, or deleted. Modules may also generate new field-sets, populated with field members derived from the analysis of one or more extant field-sets. The operation of a given arrangement of pipelined modules upon field-sets constitutes the processing of one of the models upon the data input to the model, consequently generating some output that is passed to a subsequent model.

According to one embodiment, a plurality of sets of modules that instantiate one or more models for each level of a hierarchy are provided. In the case of the UTM hierarchy 100, one or more network models embody network protocols and rules for assembling application messages. The one or more service models embody application protocols and APIs. The one or more application models embody end-to-end application systems with respect to a network topology and an end-user population. And, the one or more business models embody work processes and interactions between various actors and resources within a business.

The models at each level incrementally extract features from the input data, generate field members specific to one or more features, operate on the field members of one or more field-sets, and associate one or more field-sets together to form new field-sets. A generated field-set typically refers to a transaction of a next higher level in the hierarchy. The new field-sets then become the input to a subsequent level where another model further processes them. At the final stage, the field-sets corresponding to a highest level of transactions are produced.

At each level of the hierarchy, the association of lower level field-sets to form a next-level field-set is referred to as "correlation". The analysis required for correlation at a given level is performed in a distributed fashion across multiple modules, that is, no single module performs all steps required for correlation. Each module carries out an operational step that may be scaled by the addition of identical modules in parallel. In general, there is no centralized analysis engine nor any single guaranteed path through the pipeline for any field-set.

The present invention therefore provides a distributed and scalable transaction correlation method that operates upon dynamic sets of field members processed in a pipeline 200 of sequences of modules 505, 510, sequences arranged in a hierarchy 100 of stages within independent layers, each sequence representing a particular domain knowledge model.

To achieve high efficiencies in transaction monitoring, the present invention provides several unique design principles that may be employed to reduce inefficiencies in a transaction analysis system (e.g., 300). These may include the following. First, bringing processing and analysis to the data (as opposed to the converse). This reduces data shipping and handling time costs. Second, stratifying message decoding, analysis, and transaction re-construction into discrete, independent layers. This allows for inter-changeable models for each layer to be incorporated according to the system (e.g., 400) being monitored. Decoupling the layers allows resources to be more easily applied to bottlenecks. Third, employing semantic (domain knowledge) models that are linearizable. The use of domain knowledge models increases accuracy in real-world implementations. Linearizability allows for use of independent processing steps in that it reduces redundant code through re-use of modules and provides scalability through parallelization of modules. Fourth, localizing processing to points where requisite data becomes available. Performing incremental processing local to generation of requisite data reduces the need for persistence of some data and reduces redundancy of model implementation. This reduces or eliminates centralized processing and analysis. Fifth, performing analysis and correlation across modules. This allows for no centralized analysis engine, for requisite data to be generated across modules (e.g., passed as dynamic field-sets), and for only retrieving data as required for each increment.

Figure 2:
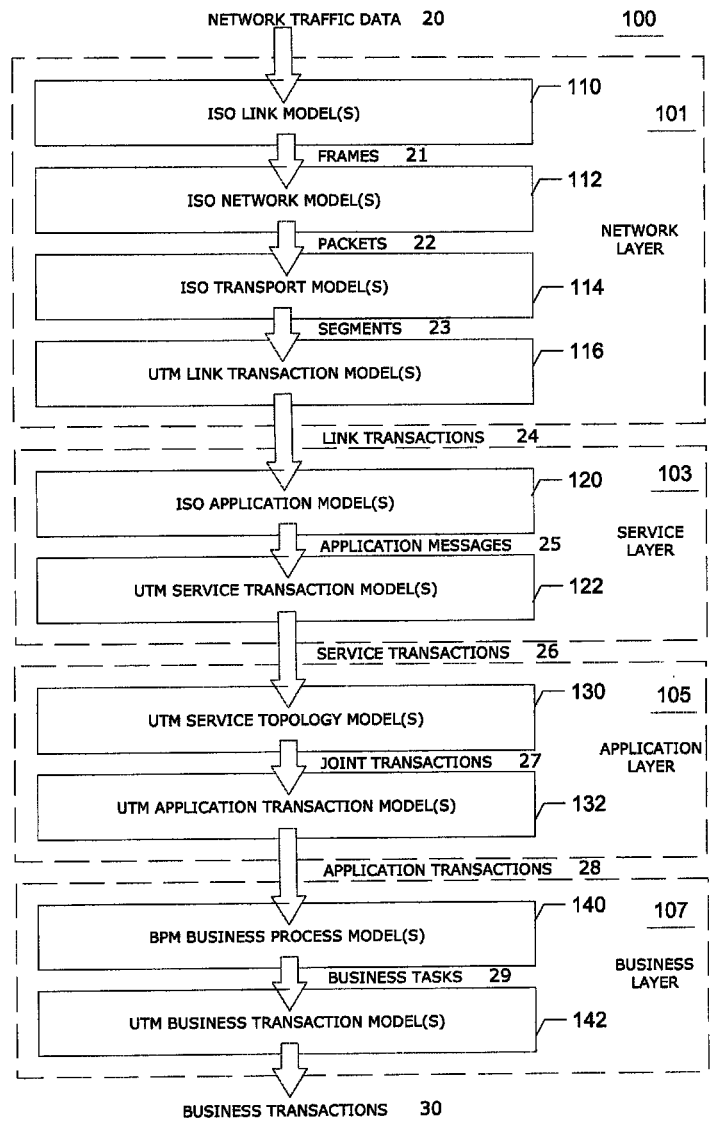
FIG. 2 is a block diagram illustrating a Unified Transaction Model ("UTM") hierarchy in accordance with an embodiment of the invention.

FIG. 2 is a block diagram illustrating a Unified Transaction Model ("UTM") hierarchy 100 in accordance with an embodiment of the invention. According to one embodiment, a method and system for business transaction monitoring is provided wherein the transactions specific to an end-user or business process are executed between nodes of a complex distributed network-connected application 400 and are subsequently constructed from network traffic data 20. The invention provides an analysis process whereby: network traffic data 20 is progressively decoded and assembled to extract individual application messages; the messages are correlated to define specific exchanges of data between nodes; transactions corresponding to specific exchanges are defined and characterized; individual transactions between nodes of the application are further correlated to define end-to-end transactions over multiple network links; and, a plurality of end-to-end transactions are correlated to define a business transaction, corresponding to an end-user achieving a business goal. Processes for decode, analysis and correlation are provided that may be efficiently distributed across a flexible framework of pipelined modules operating on dynamic sets of key-value pairs and subsequently optimized for high performance scalable real-time operation.

According to one embodiment, a framework or hierarchy 100 for assembling business transactions from network traffic data may be constructed as a series of independent layers. Each layer maps to a specific layer of application implementation. One or more domain knowledge models may be employed at each layer. A "domain knowledge model", or "semantic model", is a collection of machine-interpretable representations pertaining to a specific area of knowledge where the representations are of sets of concepts and the relationships between those concepts, expressed in terms of meaning ascribed by a user within that area. An effective domain knowledge model incorporates functional/mechanical details (e.g., network protocols, syntactic information, etc.) and also domain knowledge regarding the operation and behaviour of implementations under a range of circumstances (e.g., semantic information, etc.). Unintended system and configuration errors, dysfunctional behaviours, and limiting cases must be accounted for. As discussed above, a simple mechanical model cannot effectively process data arising from real-world situations in complex environments.

Each layer may be composed of multiple stages of processing and analysis. Each stage corresponds to at least one domain knowledge model. Multiple domain knowledge models may operate in parallel to provide a plurality of processing options at a given stage. For example, a stage corresponding to "Transport" in the ISO Model may have a domain knowledge model for TCP and another for UDP. This allows for effective operation in a variety of different distributed application environments.

The domain knowledge model(s) specific to each stage operates on data passed into it. Each stage accepts datasets as input, modifies them according to the model, and passes them on to a subsequent stage. For example, datasets corresponding to IP packets may be operated upon by an IP-specific model to produce data describing TCP segments and corresponding network messages. The TCP segment data may then be operated on by a TCP-specific model to produce Point of Sale ("POS") application message data and to correlate sets of network messages into network transactions. A POS-specific model may be applied to the application message data to correlate sets of messages into POS-type service transactions, and so on. Each of these domain knowledge model implementations represents a distinct stage.

According to one embodiment, a series of stages may be identified as corresponding to a specific layer according to a particular hierarchical structure. In principle and design, a given layer is independent from the next. Furthermore, each layer produces its own type of transaction. For example, according to one embodiment, layers may be implemented according to the Unified Transaction Model ("UTM") hierarchy 100. The UTM hierarchy 100 defines a specific approach to stratifying a distributed application into independent layers. For example, according to one embodiment of the UTM hierarchy 100, the independent layers may describe the following. First, network connections and data transport. In particular, how connections are made, data transferred, and acknowledgements returned between nodes according to network protocols and operation models. Domain knowledge model(s) accounting for network interface mis-configuration, different network stacks, timeouts and network error conditions may be provided. Note that the network layer produces "network transactions". Second, node-to-node data message exchanges. In particular, how transactions are composed from a sequenced exchange of application messages based on application protocols. Domain knowledge model(s) accounting for application design variation, error conditions, variations of application protocol implementations, and impact of network conditions may be provided. Note that the service layer produces "service transactions". Third, application functionalities with respect to end-user task execution. In particular, how the service topology fulfills an end-user task in terms of the application functionalities presented at the user interface. Domain knowledge model(s) accounting for variations in topology, impact of network response, end-user interface implementations, end-user work flow, and response to error conditions may be provided. Note that the application layer produces end-to-end "application transactions". Fourth, business process and workflow. In particular, how application execution represents aspects of processes such as workflow and business operation. Domain knowledge model(s) accounting for variations in business process, end-user behaviours, non-technological aspects, and impact of technology issues may be provided. Note that the business layer produces "business transactions".

As shown in FIG. 2, each layer 101, 103, 105, 107 of the UTM hierarchy 100 may comprise one or more stages 110, 112, 114, 116, 120, 122, 130, 132, 140, 142, each layer consuming certain type(s) of data produced by preceding layers, and generating a type of transaction specific to that layer.

The first layer 101 of the UTM hierarchy 100 consumes network traffic data 20. For example, network traffic from an Ethernet/IP network may be monitored at the "mirror port" of a network switch, or by a hardware or software agent within the infrastructure of the application system 400, or recorded to file by a utility such as TCPdump. The monitored network traffic data 20 is passed into the monitoring system 300 for processing and analysis.

If the incoming network traffic data 20 is in the format of Ethernet frames, the first stage 110 of the first layer 101 may implement a domain knowledge model specific to Ethernet. Alternatively, the first stage 110 may implement other link-level models according to the network traffic data 20. The first stage 110 processes the frames to extract information related to Ethernet and passes onward the frame data payload, typically corresponding to IP packets. The next stage 112 may implement a model specific to IP, for example, it may strip away and decode the IP header from the IP packet data, extracting the IP information, and passing the IP data payload on to a next (third) stage 114. The subsequent stage 114 may identify if the payload corresponds to one of ICMP, UDP, or TCP or other subsequent protocol, processing it with the appropriate domain knowledge model. The results of processing are again passed forward to a subsequent (fourth) stage 116. Each stage 110, 112, 114, 116 builds upon the analysis of the previous stages until the final objective of end-to-end application transactions, or business-level transactions, are achieved. At the end of each stage, new datasets may be generated that correspond to types of data.

For example, for a relatively simple distributed application, using a TCP/IP network with a simple application protocol, each stage of analysis produces a new result, starting from the processing of the initial network traffic data 20: frames 21→packets 22; packets 22→segments 23; segments 23→link transactions 24; link transactions 24→application messages 25; application messages 25→service transactions 26; service transactions 26—joint transactions 27; joint transactions 27→application transactions 28; application transactions 28—business tasks 29; and, business tasks 29→business transactions 30. Note that granularity (e.g., of data, etc.) generally progresses from finer to coarser as one moves from frames 21 through to business transactions 30. For example, the granularity of service transactions 26 would be coarser than the granularity of link transactions 24.

Each stage (e.g., 110) represents an implemented domain knowledge model. Each domain knowledge model is expressed as a linear sequence of operations or steps. Each operation is applied in sequence on the data that is passed through it. Each operation or step may constitute a generic processing task that is appropriately parameterized. For example, one step in a given stage may be to inspect data to identify the protocol being used. The identification may result in the data being labelled so that subsequent operations may utilize the information appropriately. Each operation is implemented in code as a module (e.g., 505) that accepts data as input and generates output. A module 505 is a self-contained unit which itself offers a specific service and may be linked other such units to form a more complex system. Modules are pipelined together so that the output of a preceding module becomes the input to the subsequent module. Within a given stage (e.g., 110), a domain knowledge model is implemented as a series of pipelined modules.

Figure 3:
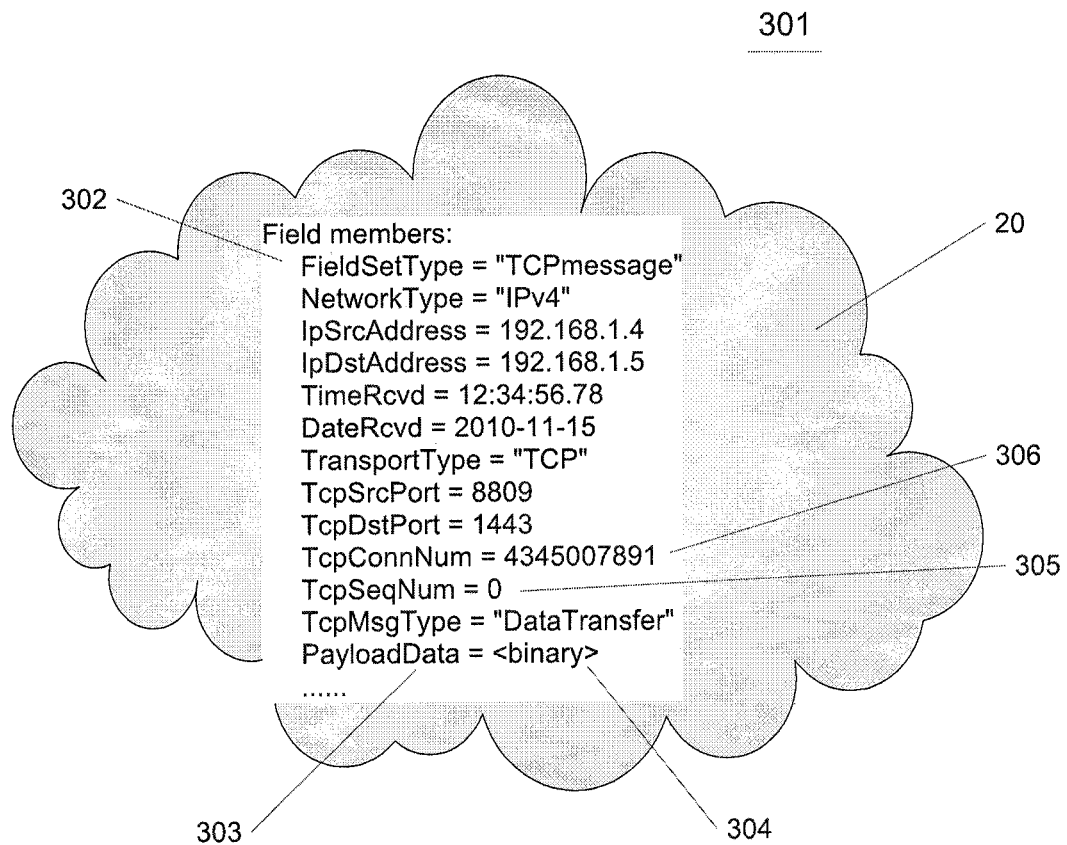
FIG. 3 is a block diagram illustrating an exemplary field-set in accordance with an embodiment of the invention.

FIG. 3 is a block diagram illustrating an exemplary field-set 301 in accordance with an embodiment of the invention. According to one embodiment, the datasets passed between modules 505, 510 are dynamic sets of field members 302. Field members 302 are pairs of elements, where one element is an identifier or field name 303 and the other element is a value 304 associated with the field name 303, otherwise known as a name-value pair, key-value pair, field-value pair or attribute-value pair. FIG. 3 shows an exemplary field-set as a "cloud" of field members 302 insofar as a field-set 301 is well-defined at any point but does not have a pre-determined structure or membership. The values 304 are atomic types such as integers, strings, real numbers, booleans, and binary data. Other value types are also possible. A field-set 301 may include an arbitrary mixture of field members 302 with different value types. Field-sets 301 are dynamic in that modules 331 operating on a given field-set 301 may add, modify, or delete field members 302 depending on the outcome of their operation. Certain modules 505, 510 may also generate new field-sets 301 derived from extant field-sets 301.

According to other embodiments, the field members 302 might be other than key-value pairs (e.g., more than two elements, a single element, etc.) and field-sets 301 may contain field members 302 with different numbers of elements (i.e., the field-set 301 is not homogeneous).

Field-sets 301 may be typed. For example, a field-set 301 may have a field member 302 that explicitly defines the type or a field-set 301 may be identified as a type by the presence or absence of certain field members 302. Field-set types may correspond to types of data such as network packets, application messages, or transactions. A field-set type may be composed of or derived from one or more of another type.

According to one embodiment, there may be a linkage table as part of the field-set 301 that defines its position within a fixed hierarchy (e.g., 100). The linkage table may explicitly point to other field-sets 301 of types corresponding to other layers.

In FIG. 2, each layer 101, 103, 105, 107 is associated with a particular type of field-set 301 that is generated within that layer. For example, the network layer 101 consumes network traffic data 20 and generates field-sets 301 corresponding to TCP data segments 23 and network-level transactions (i.e., link transactions 24 within the UTM hierarchy 100). The service layer 103 extracts application messages 25 from field-sets 301 and uses them to generate service transaction 26 field-sets 301. Similarly, the application layer 105 consumes service-level transaction 26 field-sets 301 to produce joint transactions 27 and uses them to generate end-to-end application-level transaction 28 field-sets 301. Similarly, the business layer 107 consumes application transaction 28 field-sets 301 to produce business tasks 29 and uses them to generate business-level transaction field-sets 301. A given type of field-set 301 is derived from one or more of the preceding types of field-sets 301. So for example, a service transaction field-set 301 may point back to link transaction field-sets 301 that comprise it and forward to application transaction field-sets 301 that include it.

A field-set 301 comprises at least one field member 302. Field-sets 301 may have one or more binary type field members 302 that contain yet-to-be-processed data such as data payloads derived from the network traffic data 20.

Field-sets 301 received as input by a module may be examined and/or altered before being passed out to a subsequent module. A field-set 301 may also be held within a module for a certain period of time before being passed onward. Field-sets 301 may also be dropped or deleted as in the case of a module that is acting as a filter. As a consequence, the population of field-sets 301 and the contents of any field-set 301 in the pipeline 200 are dynamic.

The operation of a given module on a field-set 301 may result in one or more of the following effects: inspection of one or more of the field members 302; partial or complete processing of payload data 304 in a binary field member 302; reduction or elimination of the payload data 304 due to processing; addition of zero or more new field members 302; modification of zero or more existing field members 302; deletion of zero or more existing field members 302; drop of the field-set 301 (e.g., removed from local module memory and not sent to output); deletion of the field-set 301 (e.g., removed from local module memory and from the datastore 360); buffering of the field-set 301 until some local condition is met; and, creation of a new field-set 301 derived from local processing of one or more extant field-sets 301.

According to one embodiment, the field members 302 of a field-set 301 may contain field names 303 and values 304 obtained from the network traffic data 20. The field members 302 may include syntactic information (e.g., 305) and semantic information (e.g., 306). The semantic information 305 is derived from the network traffic data 20 and the syntactic information 305. The syntactic information 305 pertains to form (e.g., 303) and content (e.g., 304) of the network traffic data 20 and the semantic information 306 pertains to the meaning and context of the network traffic data 20 and the syntactic information 305 in relation to the network traffic (e.g., 10) and the application system (e.g., 400).

Accordingly to one embodiment, field-sets 301 are passed by reference as opposed to passing all data between modules 505, 510. This helps maintain the integrity of the data and avoids the performance cost of multiple copies. When passed by reference, a given module can access the entire contents of the field-set 301 or only the field members 302 that it requires for processing. This limits the amount of data movement required.

As such, according to one embodiment, the processing, analysis, and correlation of network traffic, to generate end-to-end transactions specific to a distributed application, is accomplished across a plurality of individual pipelined modules 505, 510, 515, 520, 522, 524, 530 as follows: each module performing a basic operation on field-sets 301 of data passed from one to the next, the data taking the form of dynamic field-sets 301 composed of key-value pairs as field-members 302; a sequence of modules 505, 510, 515, 520, 522, 524, 530 being an implementation of a domain knowledge model that composes a processing stage 110; one or more stages composing a layer from a hierarchy 100 of layers corresponding to the operation of a complex distribution application; and, network traffic data 20 passed into the lowest layer for processing, resulting in the generation of various types of transactions, each specific to a layer, up to a business-level transaction.

The modules 331 incrementally execute the analysis, local to the availability of the requisite data, and generate dynamic field-sets 301 of derived values that are used by subsequent modules to execute subsequent steps. As a consequence, the analysis system 300 includes: decentralized analysis; incremental execution local to where data is available; selective parallelization of critical execution steps; data filtering and segmentation at earliest stages possible to reduce unnecessary processing and data volume; and, imbedded and distributed semantic analysis.

Due to the hierarchical and distributed nature of the method and system of the present invention, computer resources may be allocated to specific layers, to specific stages, or specific modules. When implemented in software in a typical system (e.g., 300) or virtual infrastructure, resources such as CPUs 320, cores, threads, memory 330, and datastores 360 may be shared or dedicated. It is not uncommon that the performance of a given system 300 is limited by bottlenecks in the design. It may be desirable to implement several copies of the same module in parallel and/or dedicate system resources such as a core or memory to each one. Alternately, specific modules which cannot be run in parallel may be broken into smaller modules and run sequentially so that resources may be dedicated to specific steps in the analysis. The nature of the modules 331 consequently allows the system 300 to be efficiently optimized.

Figure 4:
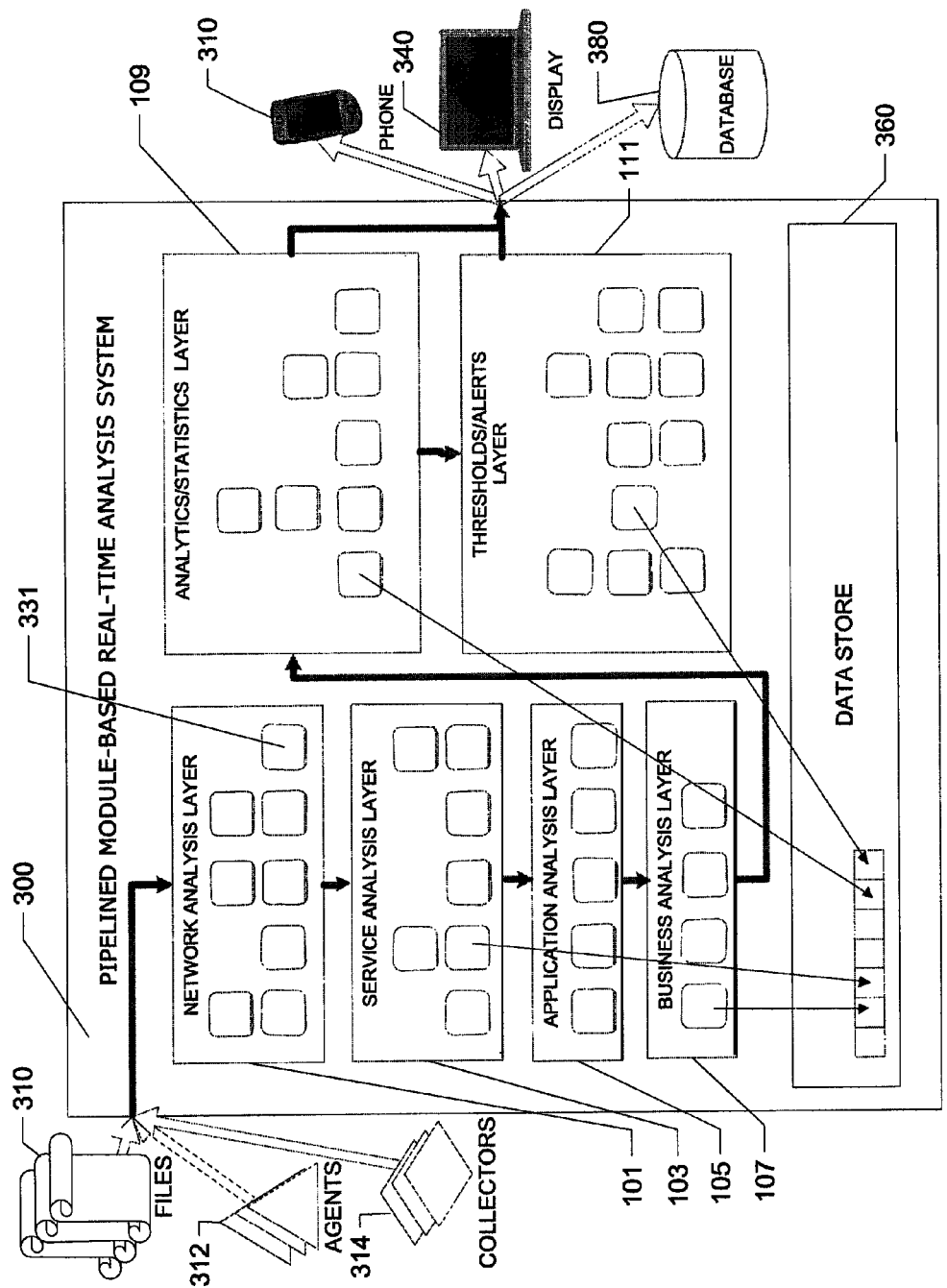
FIG. 4 is a block diagram further illustrating the data processing system of FIG. 1 in accordance with an embodiment of the invention.

FIG. 4 is a block diagram further illustrating the data processing system 300 of FIG. 1 in accordance with an embodiment of the invention. In FIG. 4, the data processing system 300 is configured as a business transaction monitoring system 300. The system 300 includes one or more sources of monitored network traffic data 20 (e.g., files 310, agents 312, and collectors 314), a plurality of layers (e.g., network analysis layer 101, service analysis layer 103, application analysis layer 105, business analysis layer 107, analytics/statistics layer 109, and threshold/alerts layer 111) composed of stages, each stage composed of modules (e.g., 331), a datastore 360, various user interfaces 310, 340, and an external database 380. Files 310 may be static files of network traffic data 20 generated previously by a monitoring system (e.g., 300), agents 312 may be applications that reside on nodes (e.g., 430), and collectors or network collectors 314 may gather network traffic data 20 from the network traffic 10 (such as at the mirror port of switches). While the present invention mainly pertains to decode, analysis, and correlation processes, it may also be applied to layers responsible for other aspects of the transaction monitoring system 300 such as analytics/statistics 109 and alerts 111.

An operational example of the present invention will now be described.

Figure 5:
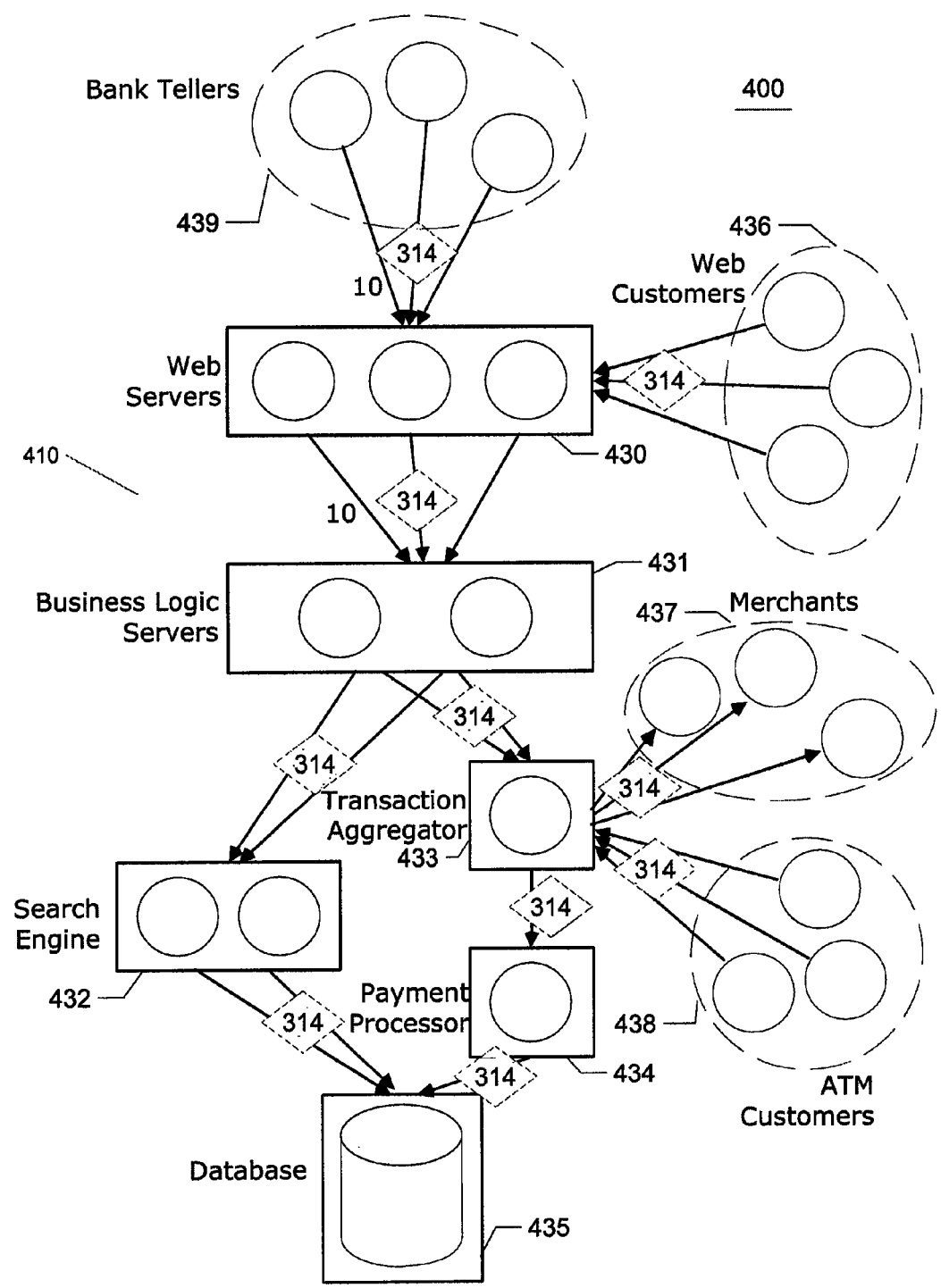
FIG. 5 is a block diagram illustrating nodes of an exemplary application system in accordance with an embodiment of the invention.

FIG. 5 is a block diagram illustrating nodes of an exemplary application system (e.g., a banking system) 400 in accordance with an embodiment of the invention. Consider a transaction monitoring solution in accordance with the present invention that is deployed in the environment of a complex distributed system 400. The system 400 may provide financial services to banking customers including through ATMs, banking tellers at branch locations, via Web browsers across the Internet, and from mobile smart-phones running banking or digital wallet apps. Depending on the method of access and account status, banking customers may: deposit and withdraw funds (cash or digital); transfer funds between accounts; arrange regular payments to 3rd parties; make point-of-sale or on-line payments to merchants; update personal information; request account activity and status information; arrange loans or lines of credit; and, open, close, or modify accounts.

Although this example is specific to financial and banking services, this approach is applicable to a wide range of distributed application systems. FIG. 5 shows the network topology 410 of the exemplary application system 400 which is composed of multiple nodes (e.g., web servers 430, business logic servers 431, search engine 432, transaction aggregator 433, payment processor 434, database 435, web customers 436, merchants 437, ATM customers 438, bank tellers 439) communicating across network connections, each node or group of nodes representing a different service. Each service may use different protocols and exchange different types of messages. A specific set of messages passed between two nodes may constitute a type of transaction. A given transaction may be related to another transaction between the same nodes or between other nodes. In order to monitor network traffic on such a complex system 400 and effectively correlate the business transactions, multiple layers of analysis, composed of multiple stages, are required.

In this example, the stages of implemented models include the following: Ethernet model (e.g., 110, 112) (which corresponds to the ISO link layer, analyzes network frames 21 from monitored network traffic data 20, and assembles frame payloads into IP packets 22); Internet Protocol ("IP") model (e.g., 114) (which corresponds to ISO network layer, analyzes IP packets 22, and assembles packet payloads into TCP segments 23); network link transaction correlation model (e.g., 116) (which corresponds to the UTM network layer 101 and assembles link transactions 24 from TCP segments 23); Transmission Control Protocol ("TCP") model (which corresponds to ISO transport layer, analyzes TCP segments, and assembles segment payloads into HTTP messages); Hyper-Text Transport Protocol ("HTTP") model (which corresponds to the ISO application layer, analyzes application messages 25 and assembles application payload into SOAP messages); Simple Object Access Protocol ("SOAP") model (which corresponds to the ISO application layer, analyzes SOAP messages, and extracts and analyzes contents of application messages such as XML); service transaction correlation model (e.g., 120, 122) (which corresponds to the UTM service layer 103, assembles service transactions 26 based on service topology from application messages 25 on one or more links and correlates link transactions 24 carrying application messages 25 into service transactions 26); application transaction correlation model (e.g., 130, 132) (which corresponds to the UTM application layer 105 and correlates joint transactions 27 from service transactions 26 and then subsequently correlates joint transactions 27 into end-to-end application transactions 28); and, business transaction correlation model (e.g., 140, 142) (which corresponds to the UTM business layer 107, defines business tasks 29 from application transactions 28, and then subsequently correlates business tasks 29 into business transactions 30).

Examples of module operations are described in the following. This is a simplified embodiment. Variations of this embodiment may be used, for example, different layers may be constructed, different models may be implemented, and the layout of the modules may vary. An exemplary transaction monitoring solution includes one or more network collectors 314 connected to the mirror ports of selected network switches within the infrastructure of the application system 400. The network collectors 314 forward copies of network traffic data 20 from each switch to the central analysis system 300. The network collectors 314 may selectively filter or otherwise pre-process the network traffic data 20 to eliminate undesirable or inappropriate data. For example, unrelated management traffic such as DNS, NTP, ICMP, and Net BIOS may be removed before network traffic data 20 is sent to the analysis system 300 for analysis.

Figure 6:
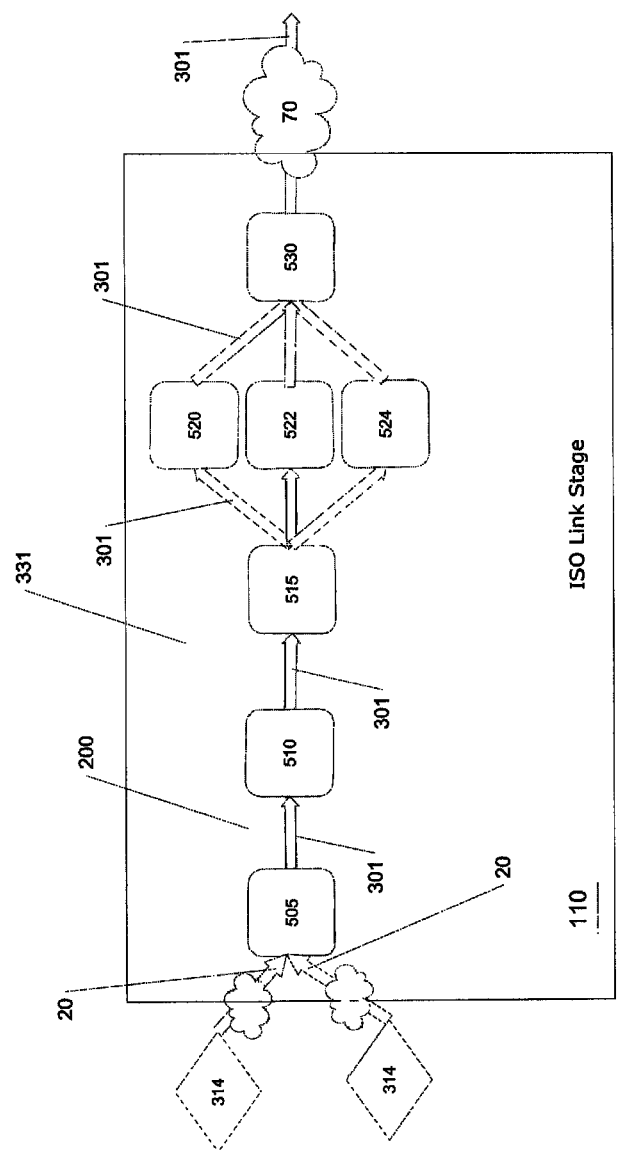
FIG. 6 is a block diagram illustrating operations of modules within an exemplary ISO link stage in accordance with an embodiment of the invention.

FIG. 6 is a block diagram illustrating operations of modules (e.g., 505, 510, 331) within an exemplary ISO link stage 110 in accordance with an embodiment of the invention. The first stage 110 of the analysis system 300 receives the network traffic data 20 from the network collectors 314 at a first module 505 of the system 300. The first module 505 receives network traffic data 20 from network collectors 314. The first module 505 receives the data 20 as Ethernet frames 21 monitored by the network collectors 314. The first module's functionality may be limited to receiving data 20 as network frames 21 and generating initial field-sets 301 including unprocessed network payload data.

An initially generated field-set 301 contains the raw data of the Ethernet frame 21 as a binary field member 302 (referred to as the payload data) and other field members 302 as follows: the data payload containing the Ethernet frame (PayLoad=<binary data>); the identifier for the network collector 314 (CollectorName="Coll12" (string)); the time of receipt by module 505 (RcvTimestamp="14:23:12.135-11-10-2011" (timestamp)); a universally unique identifier (UUID) (UUID=<128 bit integer>); any meta-data sent by the network collector 314 such as the time of receipt at the network collector 314 (CollRevTime="14:23:11.789-11-10-2011" (timestamp)); frame sequence number (FrameSeqNum=00987110 (integer)); received frame size (FrameSize=1500 (integer)); MTU at port of the network collector 314 (LocalMTU=1500 (integer)); and, frame status (FrameStatus="Normal" (string)).

Module 505 sends the field-set 301 to output to be received by a subsequent module 510. Module 505 then processes the next available data 20 sent from the network collector(s) 314.

The subsequent module 510 implements the functionality of a temporary buffer. It holds received field-sets 301 in a local memory buffer until an internally generated signal releases the field-set 301 to the next module 515.

The subsequent module 515 implements the functionality of detection of the type of protocol composing the payload of the field-set 301. It examines the payload data for characteristic information to detect if Ethernet or some other protocol is being employed. Upon detecting Ethernet, it adds a field member 302 to the field-set 301 such as Layer2Protocol="Ethernet" and sends the field-set 301 to its output.

The output of module 515 is connected to subsequent modules 520, 522, 524. Each subsequent module implements a different protocol decoder. Each subsequent module 520, 522, 524 receives the field-set 301. Each module inspects the Layer2Protocol field member 302. If the value 304 is identical with the one it is configured to decode, it proceeds with the decoding step. Otherwise, the module drops the field-set 301.

Due to the nature of the underlying datastore 360, dropping a field-set 301 at a module only keeps its reference pointer from being forwarded to subsequent modules. Its information is still preserved in the datastore 360 and may be recalled later if needed for other purposes such as statistical analysis or presentation to the user.

In this example, module 520 decodes Ethernet and processes the field-set 301. It removes the Ethernet header from the data payload and decodes it. From the decoded header, module 520 generates one or more field members 302 such as the destination and source MAC addresses. Module 520 replaces the payload field member value 304 with the Ethernet payload less the Ethernet header and adds the new field members 302 in the field-set 301. The field-set 301 is then sent to output. It is to be noted that there are several different types of Ethernet frames. Module 520 may handle all available types. Alternatively, a module for each frame type may be provided whereby a preceding module detects the type and adds an appropriate field member 302 to the field-set 301 such as EthernetFrameType="Ethernet2.0". Unsupported types may simply be dropped without further processing. Other aspects of the Ethernet model may be included such as doing a CRC check against the CRC sequence number to determine if the payload is corrupted. It should be noted that not all variations in implementation are described in this example embodiment.

The resulting field-set 301 is then passed to a subsequent module 530. Module 530 checks the field-set 301 for completeness and performs a "sanity check" on certain field members 302 to ensure they exist and/or have values 304 within appropriate ranges. An incomplete field-set 301 or failure on the sanity check results in field members 302 being added that indicate the problem or issue. The field-set 301 is then sent to output 70. Module 530 is the end of the link stage 110. The subsequent module 605 represents the beginning of the subsequent network stage 112.

Figure 7:
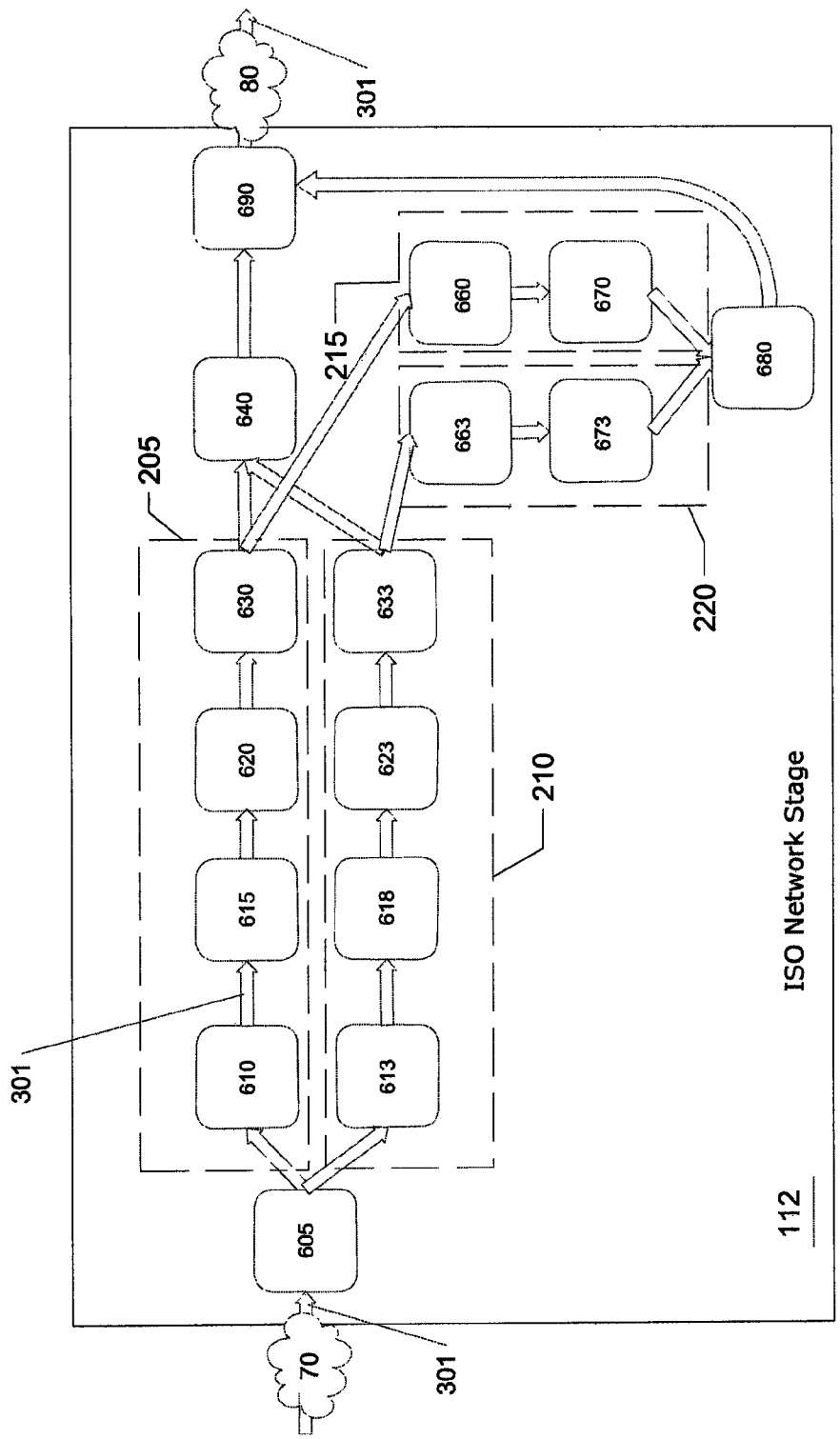
FIG. 7 is a block diagram illustrating operations of modules within an exemplary ISO network stage in accordance with an embodiment of the invention.

FIG. 7 is a block diagram illustrating operations of modules (e.g., 605, 610, 331) within an exemplary ISO network stage 112 in accordance with an embodiment of the invention. The next subsequent module 605 detects if the payload of the field-set 301 contains a header for any protocol implemented in the network stage 112. If such a header is present, module 605 adds a field member 302 indicating the protocol type. Protocols that might be identified include Internet Protocol version 4 (IPv4) or version 6 (IPv6). In this example, the field member 302 NetworkProtocol="IPv4" is generated. The field member 302 is added to the field-set 301 and sent to output. If no recognized protocol header is present, the field member value 304 may be NetworkProtocol="none" or the field-set 301 may be dropped.

The subsequent modules 610, 613 each support a different version of IP. Modules 610, 615, 620, 630 are the implemented model 205 for IPv4. Similarly, modules 613, 618, 623, 633 are the implemented model 210 for IPv6. Each module 610, 613 receives the current field-set 301 and will drop those field-sets 301 that do not match its implementation.

Module 610 implemented for IPv4 receives the field-set 301 and accepts it. It strips the IPv4 header from the Ethernet payload and decodes it. Each field from the header is translated into a field member 302. These include the following: IP source and destination addresses; DSCP value; Identification number; Header checksum; Protocol number; Packet length; Fragment offset; and, Flags including "DoNotFragment" and "MoreFragments".

The subsequent module 615 implements a filter to eliminate field-sets 301 according to IP address. Traffic between IP nodes that is not of interest may be filtered out to reduce load on the monitoring system 300. A field-set 301 which matches a particular pattern for the IP address may be passed onward and all other field-sets 301 dropped. Many different patterns may be used to filter field-sets 301, based on IP address or other field-member values 304, or the presence/absence of field-members 302. Those field-sets 301 passing through the filter are sent to output.

The subsequent module 620 implements detection of packet 22 fragments. IPv4 packets may be fragmented across multiple Ethernet frames. This may happen in the case of the MTU (maximum transmission unit) changing value at a mid-path IP interface. When a router receives packets on one interface that are larger than the MTU of a subsequent IP interface it must send from, it has the option to break the packet into fragments if the appropriate flags are set. Each fragment within an Ethernet frame will be the size of the subsequent MTU value or smaller. Bit 2 of the header "Flags" value is set, indicating that the packet has been fragmented and additional fragments are expected. The last fragment has bit 2 cleared but the fragment offset is non-zero. Fragmentation is a costly operation for a router. Consequently, IP packets are routinely configured with the "Do Not Fragment" bit (bit 1 of the Flags value) set so that instead the router drops packets larger than the egress interface MTU. Mid-path changes in MTU value are not uncommon resulting in packet loss in some cases and fragmentation in other cases. IPv4 packet fragmentation is typically an unintended consequence of mis-configuration and/or incomplete implementation of the IPv4 protocol. Domain knowledge of this phenomenon is required to correctly handle and interpret the presence of packet fragments.

Module 620 buffers field-sets 301 that indicate they are fragmented until all the fragments have arrived and the complete packet can be re-assembled as a single data payload. According to one embodiment, module 620 then creates a new field-set 301 of type "packet" and copies to it some or all of the field members 302 from the original frame field-set 301 and adds new field members 302 with values 304 extracted from the IP header. Module 620 attaches the new data payload to the new packet field-set 301. Non-fragmented packets are immediately transferred into a new data payload. According to another embodiment, module 620 simply adds new field members 302 to the field-set 301 corresponding to the first fragment. It then carries field members 302 relating to both the Ethernet frame and the related IPv4 packet.

Module 620 adds new field members 302 specific to a re-assembled IPv4 packet as follows: Fragmented=True (boolean); Corrupted=False (boolean); NumFrags=2 (integer); and, MaxFragSize=1500 (integer).

Where a new field-set 301 is created for the re-assembled IP packet, a new UUID is also created. The new field-set 301 is sent to output. The field-sets 301 related to the fragments have a field member 302 added, such as ParentUUID, that associates them with the new field-set 301 by its UUID value. In the event that not all fragments arrive within a certain time period, the packet will be considered corrupted and the fragments available will be assembled into an incomplete data payload and added to the new field-set 301. The Corrupted field member 302 will be set to "True" 304. Other field members 302 may also be added reporting that frames were lost, how many of them, and other details.

The field-sets 301 related to the Ethernet frames may subsequently be dropped. They are not needed in the models used at higher layers. According to one embodiment, the Ethernet field-sets 301 may not be dropped but passed forward as well. According to another embodiment, there are multiple subsequent modules, some of which process Ethernet field-sets 301 further and others which process the IPv4 field-sets 301.

The subsequent module 630 performs error checking of the header checksum of the IPv4 field-sets 301 and adds field members 302 appropriately. The field-set 301 is passed to the subsequent module 640 and module 660.

All IP, both IPv4 and IPv6, field-sets 301 are passed to the subsequent module 640 and checked for completeness and sanity. One or more field member values 304 are added to reflect the status of the field-set 301. The field-sets 301 are then passed to output.

A subsequent model implemented may be another ISO network model. For example, there are methods for "tunneling" IPv6 over IPv4. In those cases, the data payload of the field-set 301 derived from IPv4 would begin with a header for IPv6. In this case, the next stage then implements a domain knowledge model for IPv6. Thus, the present invention may accommodate multiple imbedded protocols at this layer 112 and at other layers. Note that no IPv6 stage is shown in FIG. 7 subsequent to the implemented model 205 for IPv4 in this example. The implemented IPv6 model 210 is shown in parallel with model 205 in FIG. 7.

A subsequent model may include analysis and correlation for ICMP packets. ICMP is used by the network for feedback between devices which handle IP packets, particularly end-hosts. It should be noted that some devices are configured to block all ICMP packets or by ICMP type. Some types of ICMP requests are treated differently than other types by mid-path devices such as firewalls and routers. A wide range of behaviours are present according to the configuration and circumstances on the network. A domain knowledge model is required to account properly for all observed ICMP transaction behaviours.

Module 630 of the implemented IPv4 model 205 passes field-sets 301 both to module 640 and to module 660. Module 640 drops field-sets 301 related to ICMP. The subsequent module 660 is the first module of the implemented model 215 which implements analysis and processing for the ICMPv4 message protocol. Module 660 examines the data payload to determine if ICMP is present and subsequently decodes the payload, adding field members 302 specific to ICMP to the field-set 301 such as the following: NetworkMessageProtocol="ICMP"; IcmpVersion=4; IcmpCmdType="Echo Request"; and, IcmpSeqNum=6. The field-set 301 is passed to output.

The subsequent module 670 correlates ICMP v4 message field-sets 301 together according to ICMP message type. Some ICMP v4 messages such as Echo Request generate a response from the destination, in this case, an Echo Response message is sent back. Other ICMP v4 messages such as "Destination Unreachable" do not typically generate a response or are a response to transmitted packets carrying other protocols. The concept of transaction does not strictly apply to ICMP but correlation of some ICMP messages as transactions may be useful for troubleshooting and diagnosis. Depending on the implemented model for ICMP v4, new field-sets 301 related to ICMP request-response pairs may be generated and sent to output.

A similar stage may be implemented for ICMP v6. Each version of ICMP is directly tied to the underlying version of IP. ICMP v6 is significantly different from ICMP v4 and requires a separate model. Modules 663 and 673 implement an ICMP v6 domain knowledge model in sub-stage 220. This model generates new field-sets 301 related to ICMP request-response pairs and passed them to output.

The subsequent module 680 filters out the ICMP messages, both v4 and v6, that are not needed later on for analysis. It also performs a sanity check on the new ICMP field-sets 301. It passes them and any unfiltered ICMP messages to output. The field-sets 301 are subsequently passed to module 690 which associates certain ICMP messages with non-ICMP messages. ICMP messages may be related to packets sent as part of a network transaction such as in the case of when packets are dropped instead of fragmented and an ICMP message is sent back to the transmitting node. Module 690 determines if field-sets 301 received from previous module 640 are related to field-sets 301 received from previous module 680 and generates new ICMP field-sets 301 in those cases. All field-sets 301 are then passed to output 80.

Figure 8:
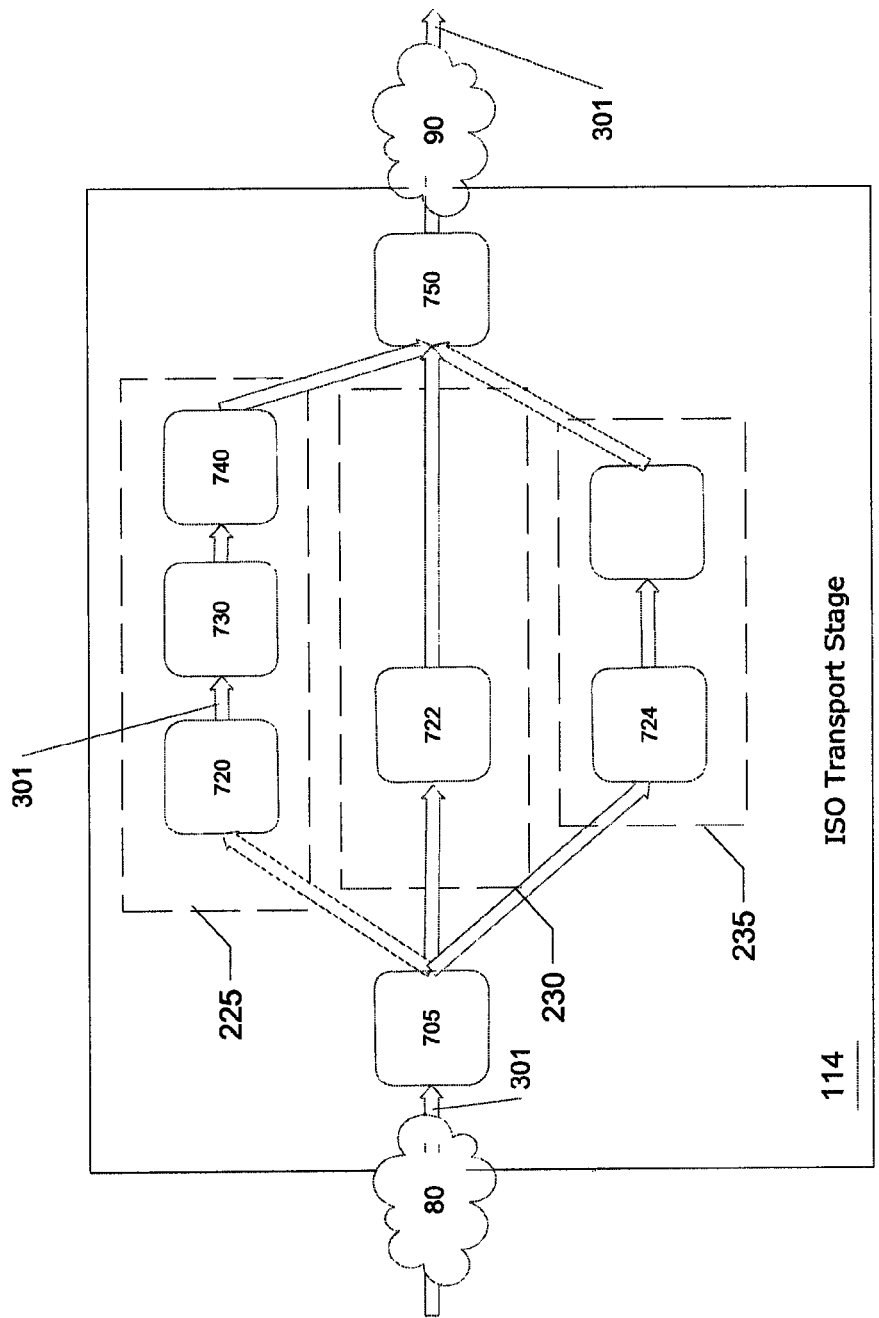
FIG. 8 is a block diagram illustrating operations of modules within an exemplary ISO transport stage in accordance with an embodiment of the invention.

FIG. 8 is a block diagram illustrating operations of modules (e.g., 705, 720, 331) within an exemplary ISO transport stage 114 in accordance with an embodiment of the invention. The subsequent module 705 processes IPv4 field-sets 301 to generate field-sets 301 specific to the transport stage 114. It receives as input the IPv4 field-sets 301 and other field-sets 301 related to the network stage 112. Module 705 detects the type of ISO transport protocol, if present, within the IPv4 field-set payload and adds a field member 302 such as TransportProtocol="TCP".

Multiple ISO transport models are implemented in sub-stages 225, 230, and 235. Subsequent respective modules 720, 722, and 724 are keyed to match different values for TransportProtocol. For example, there may be models implemented for SCTP, TCP, and UDP.

Continuing with the example, a field-set 301 may contain a payload that has been detected to include a TCP header. Module 720 receives the field-set 301, detects the appropriate value for TransportProtocol, and strips the TCP header from the payload and decodes it. An appropriate set of field members 302 are generated and added to a new field-set 301 specific to TCP segments 23 such as TCP port numbers for source and destination, TCP sequence number and various flags. The TCP payload, less the TCP header, is attached to the new field-set 301 which would be sent to output. As mentioned above, according to an alternate embodiment, the details of the TCP segment may be added to the existing field-set 301 instead of creating a new one.

The field-set 301 is received by the subsequent module 730 implementing the model for TCP and its operation in real-world networks. Knowledge of both the functional and dysfunctional operation of TCP is required. In this case, "dysfunctional" operation refers to behaviours in circumstances that are not intended for normal operation. For example, there are forms of intentional network attacks that utilize TCP messages to interfere with network communications. Specifically, the TCP RST flag can be used to close a TCP connection between two communicating nodes by a third node that sends a "forged" TCP message with the RST flag set. An effective TCP model includes domain knowledge that accommodates these behaviours.

Also, similar to the case of packets 22 across multiple frames 21, the size of a TCP segment 23 may exceed the data payload size of a single unfragmented IP packet. Consequently, the segment may be fragmented across multiple IP packets. The conventional definition of Maximum Segment Size (MSS) and the design of networks are intended to avoid this from occurring. For example, the MSS is typically constrained to a minimum value much smaller than a smallest typical MTU. The TCP model may include features which address circumstances due to network design or configuration that leads to segment fragmentation.

Although IP networks are intended to be serial such that packets arrive in the order they were sent, various devices and network designs can cause packets to arrive out of order. This results in TCP segments being out of order as well. The field-set 301 payloads must be sorted into correct order to assemble the TCP segments correctly and re-construct the original data stream sent to the network.

IP packets may also be lost, resulting in retransmission of packets containing TCP segments. Similarly, certain network circumstances can result in duplicates of packets containing TCP segments arriving. Both cases may be detected by modules of the implemented TCP model such that the data stream transmitted via TCP is correctly reassembled.

Module 730 generates field-sets 301 corresponding to TCP segments and passes them to output. The subsequent module 740 reorders the TCP segments as required and eliminates any duplicate TCP segments. Field-sets 301 of properly ordered TCP segments are passed on to a subsequent module 750 for a sanity check before being passed out of the transport stage 114.

The TCP stage 114 produces field-sets 301 representing TCP messages sent between the network interfaces of at least two nodes (see FIG. 5). Each message is identified as a particular type of TCP message based on flags set in the header, for example, SYN, ACK, PSH, FIN, RST and others. In some cases, multiple flags are set (e.g., SYN and ACK). TCP is known to send specific sequences of message types in the execution of a transfer of data, depending upon the network circumstances.

Figure 9:
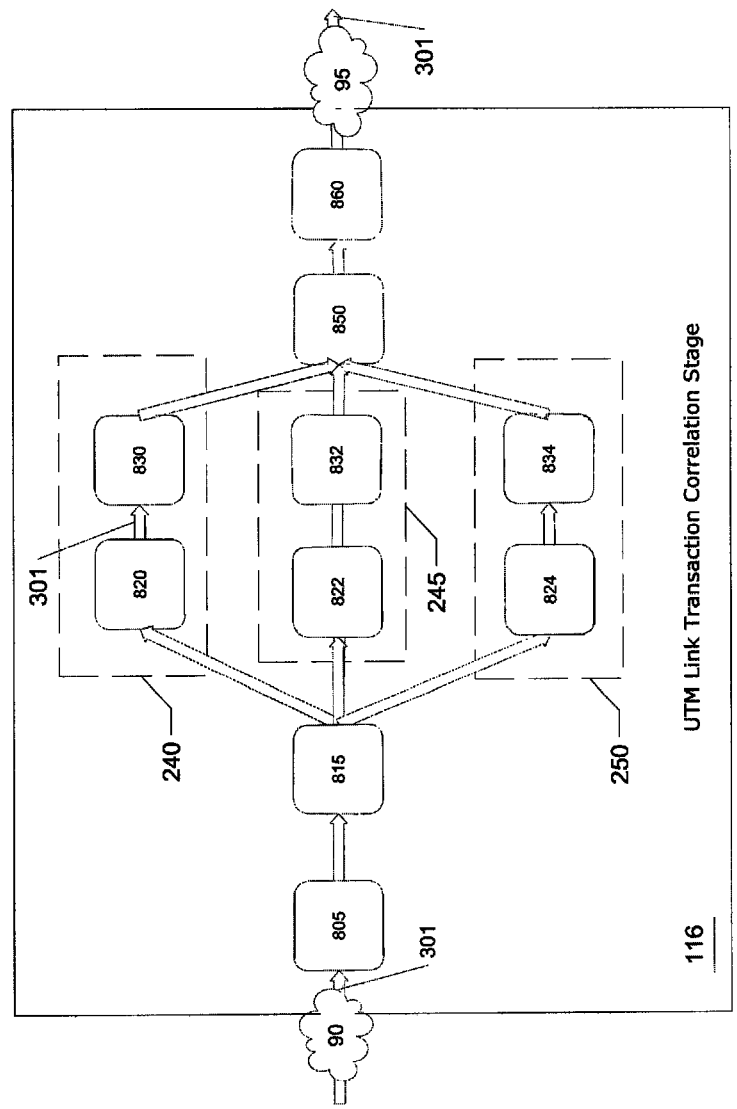
FIG. 9 is a block diagram illustrating operations of modules within an exemplary UTM link transaction correlation stage in accordance with an embodiment of the invention.

FIG. 9 is a block diagram illustrating operations of modules (e.g., 805, 815, 331) within an exemplary UTM link transaction correlation stage 116 in accordance with an embodiment of the invention. Stage 116 implements a model for link transaction correlation. This conceptual model derives from the UTM hierarchy 100 as it defines link transactions. The network layer 101 concludes with stage 116 and the output of link transaction field-sets 301 and so the layer boundary corresponds to the UTM link layer. The first module 805 accepts 90 the TCP network message field-sets 301 and assigns message types with respect to the TCP flags and content. If multiple flags are present in a single TCP header, multiple TCP message field-sets 301 may be created to represent each one. Thus, a TCP segment containing both a SYN and an ACK flag may be separated into two field-sets 301, one each for the SYN and for the ACK. The resulting field-sets 301 are sent to output.

The subsequent module 815 acts as a filter similar to module 615. It filters against the port numbers, in combination with the IP addresses, to further eliminate field-sets 301 that are not of interest. Those field-sets 301 that pass the filter are sent to output.

Module 815 identifies the TCP connection each message belongs to. For example, a TCP segment field-set 301 may arrive with field members 302 including the following: IpSrcAddr=192.168.0.1 (IP address); IpDstAddr=192.168.0.2 (IP address); TcpSrcPort=16098 (integer); TcpDstPort=1000 (integer); TcpMsgType="SYN" (string); and, TcpSeqNum=0 (integer). The field member TcpSeqNum=0 identifies a position in a sequence of transmitted messages and hence is an example of syntactic information 305. As discussed above, syntactic information 305 pertains to the form and content of the network traffic data 20.

Based on the unique pair of IP addresses and TCP ports, the SYN indicates that a new connection is being established. Module 815 adds a field member 302 indicating a unique identifier for this TCP connection (e.g., TcpConnNum=4345007891 (integer)). It then passes this field-set 301 to output. The field member TcpConnNum=4345007891 is derived from syntactic information 305 such as the field member TcpSeqNum=0 and network traffic data 20 and hence is an example of semantic information 306. As discussed above, semantic information 306 pertains to the meaning and context of the network traffic data 20 and the syntactic information 305 in relation to the network traffic 10 and the application system 400.

Figure 12:
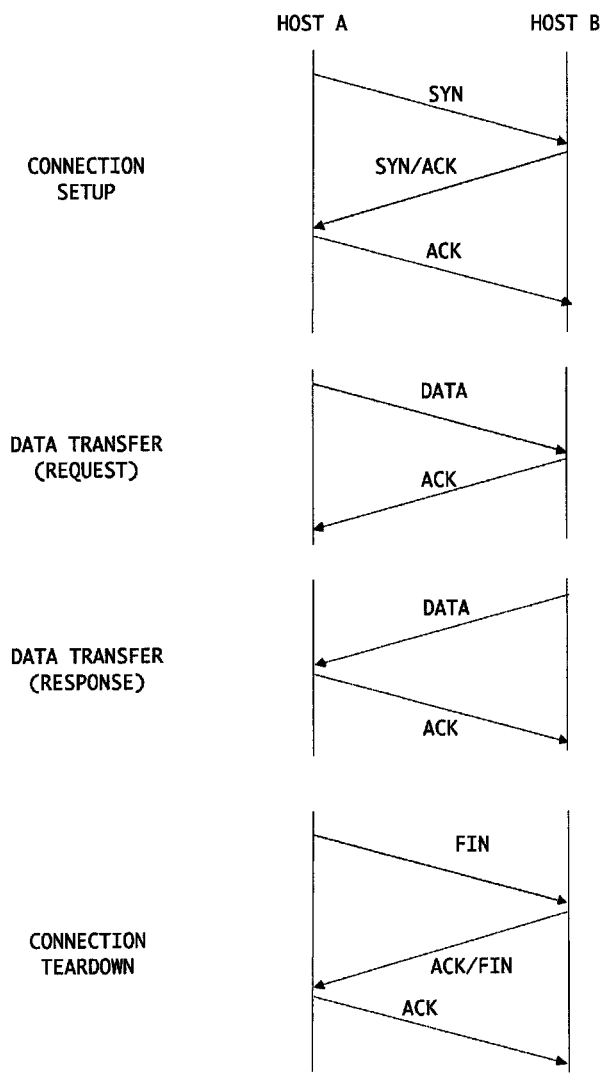
FIG. 12 is a diagram illustrating an exemplary exchange of TCP messages in accordance with an embodiment of the invention; and, FIG. 13 is a flow chart illustrating operations of modules within a data processing system for generating transaction data from network traffic data for an application system which is distributed across a plurality of network connected nodes, in accordance with an embodiment of the invention.

A link transaction 24 is defined as a specific exchange of TCP messages. Each exchange corresponds to a network level action or event. Examples of a network event include the following: setting up a TCP network connection; tearing down a TCP network connection; and, transferring data. FIG. 12 shows the conventional exchanges of messages associated with each event.

The subsequent module 820 is the first module in the TCP message correlation sub-stage 240 which correlates the TCP messages together to produce new field-sets 301 of type link transaction with field member TransType="LinkTrans". It correlates TCP field-sets 301 according to known sequences of TCP messages. For example, a TCP connection setup is identified as the three-way handshake between two nodes as follows: SYN→; ←SYN-ACK; and, ACK→. With the SYN-ACK separated into two TCP messages by module 805, the exchange of TCP messages looks like the following: SYN→; ←ACK; ←SYN; and, ACK→. As each message arrives at the module 820, it identifies the TCP connection they correspond to and associates them together.

In the case of a connection setup, module 820 receives the TCP field-set 301 with the SYN message type from source IP address 192.168.0.2 to destination IP address 192.168.0.1 and determines that this message corresponds to the beginning of a new link transaction of type connection setup. Module 820 generates a link transaction field-set 301 with field members 302 derived from the TCP field-set 301. It adds a field member 302 ParentUUID to the original TCP field-set 301 with the value 304 of the UUID of the new field-set 301. Module 820 holds the TCP field-set 301, anticipating an ACK-type TCP message arriving with the destination IP address 192.168.0.1 at TCP port 16908 with TCP sequence number 1. Further, it anticipates a subsequent SYN message from the same source and a final ACK coming from the same source as the first SYN.

Once the anticipated TCP messages have arrived, they are updated with the UUID of the link transaction field-set 301 and then they are dropped. These specific messages are related to TCP connection setup and are not needed for any later analysis. The link transaction field-set 301 is augmented with field members 302 showing details related to the transaction such as the following: TransType="LinkTrans"; NumTcpMsgs=4; LinkTransType="TcpConnection"; and, LinkTransStatus="Normal". In the event that not all required TCP messages arrive, the field member 302 LinkTransStatus indicates that it is "Incomplete".

One advantageous feature of this approach is as follows. To generate the link transaction field-set 301, module 820 performs an incremental analysis that utilizes field members 302 generated much earlier in the pipeline 200. In this case, the IP addresses were decoded at module 610 in the IP stage 112, the TCP ports were decoded at module 720 in the TCP stage 114, and the TCP connection number was determined in preceding module 815 in the present stage 116. Another central feature is the early elimination of non-essential data wherein the TCP network message field-sets 301 such as when SYN and ACK for connection setup are dropped and no longer passed forward. Other types of TCP messages such as data transfers containing application messages are forwarded for further processing in later stages and layers.

Another advantageous feature of this approach is the optimization of processing through selective allocation of system resources. Assuming the link transaction correlation module is a performance bottleneck, modules 820 and 830 (sub-stage 240) might be duplicated and deployed in parallel as modules 822 and 832 (sub-stage 245), and modules 824 and 834 (sub-stage 250). Each first module 820, 822, 824 of each sub-stage 240, 245, 250 receives all the field-sets 301. Each module determines which field-sets 301 it should be working on and drops the others. For example, each module may calculate the modulo by 3 of the value 304 of field member 302 TcpConnNum and only process for TCP segments for the value of 0, 1, or 2, respectively. According to one embodiment, the means of routing field-sets 301 between modules may allow for conditional transfer of field-sets 301 based on similar conditions. Conditional routing may be used as an alternative to modules needing to conditionally drop field-sets. Each duplicated sub-stage 240, 245, 250 may be dedicated a separate thread or a core within a multi-core system (e.g., 300 with multiple CPUs 320, etc.) in order to achieve improved performance. Thus, the work of processing the field-sets 301 into link transactions may be distributed between the modules thereby reducing the bottleneck for this operation.

Link transactions 24 are defined to be composed of specific exchanges of certain TCP messages. New field-sets 301 relating to link transactions may be generated by any of the parallel modules 820, 822, 824. A link transaction field-set 301 includes a UUID field member 302 with a unique value 304. The field-sets 301 for the TCP message that constitute a given link transaction are updated with a field member 302 ParentUUID with the UUID value 304 of the link transaction. Once all TCP messages have been received or a time-out has occurred, the new link transaction field-sets 301 are updated with the status and are sent to output.

Subsequent modules 830, 832, 834 receive the link transaction field-sets 301. These modules determine the type of link transaction and also determine if the child members of the link transaction conform to specific requirements. For example, for the connection teardown type of link transaction, there is typically a 4-way handshake using FIN and ACK messages; however, some TCP stacks only perform part of the handshake (half duplex close) or routinely use the RST flag to break the connection instead. Further, RST may be sent as part of a connection teardown or in response to data loss. A domain knowledge model for TCP transactions must account for these variations in protocol implementation. Incomplete or malformed transactions are labelled accordingly. All field-sets 301 are passed to output.

The subsequent module 850 identifies link transaction field-sets 301 that are incomplete or malformed transactions. It performs a diagnostic analysis on the transaction information, including the constituent TCP messages field-sets 301, and assesses the respective causes. Packet loss or network failure, non-standard TCP stacks, or other causes may subsequently be identified. Appropriate field members 302 may be added to indicate the results of the analysis. The field-sets 301 are then sent to output.

The subsequent module 860 performs a sanity check on the link transaction field-sets 301 and passes them to output 95. Module 860 is the last module in this example implementation of the link transaction stage 116 and also the end of the network layer 101.

Figure 10:
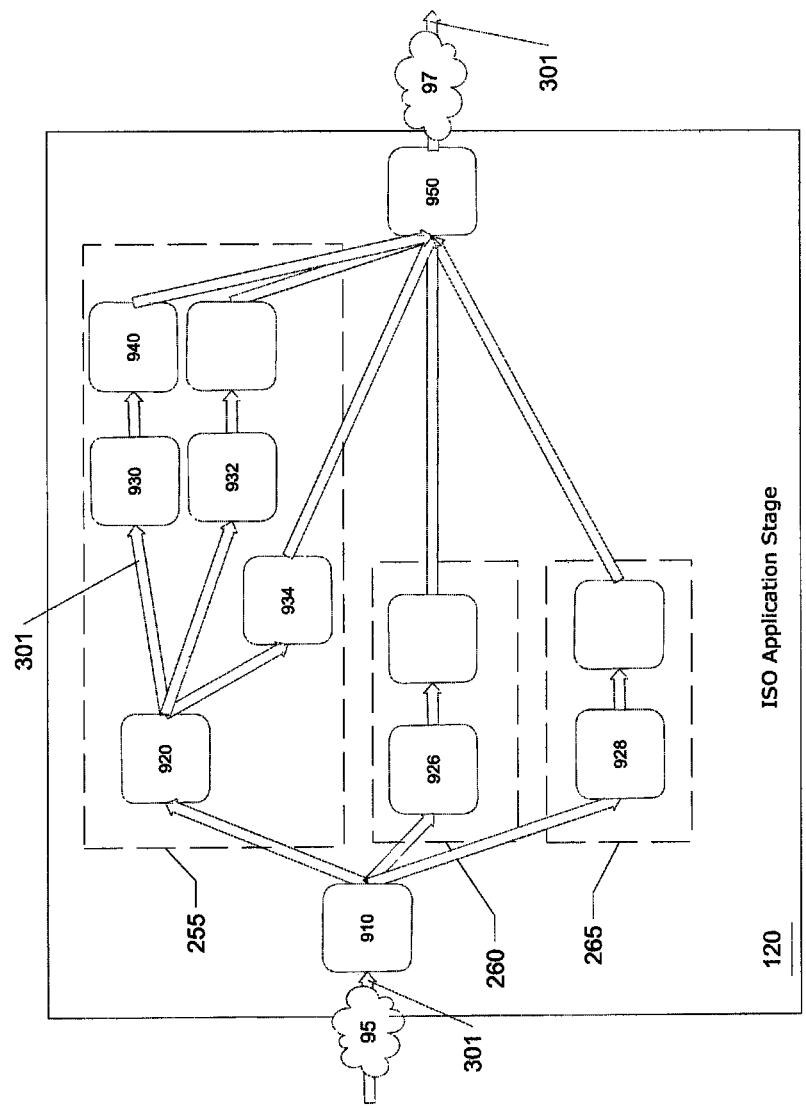
FIG. 10 is a block diagram illustrating operations of modules within an exemplary ISO application stage in accordance with an embodiment of the invention.

FIG. 10 is a block diagram illustrating operations of modules (e.g., 910, 920, 331) within an exemplary ISO application stage 120 in accordance with an embodiment of the invention. The subsequent service layer 103 includes a stage 120 for assembling application messages 25 from network data for various application protocols and a stage 122 for correlating application messages 25 into service transactions 26. The domain knowledge model implemented in this layer incorporates knowledge of the sequences of application messages sent and received that constitute various types of transactions under a given application protocol such as HTTP.

The first module 910 receives field-sets 301 from module 860. It inspects the data payload of the field-set 301 to determine what application protocol it may contain. There may be sub-stages 255, 260, 265 within stage 120 for decoding one or more different application protocols. Module 910 detects the supported application protocol HTTP and adds a field member 302 AppProtocol=HTTP. It sends the field-set 301 to output.

The subsequent modules 920, 926, 928 each receive the field-set 301. Each module operates on a different application protocol. For example, module 920 processes field-sets 301 corresponding to HTTP messages. It determines that the field member 302 AppProtocol has the correct value and begins processing. Modules 926 and 928 process other application protocols and drop their copies of the field-set 301.

Module 920 processes the payload data. It strips the HTTP header from the payload and decodes the contents into field members 302. For example, the type of HTTP message is determined such as GET, POST, PUT, or DELETE and the content type of the message payload. Subsequently, appropriate field-members 302 are added to the field-set 301 such as HttpCmdType and HttpContentType. The field-set 301 is sent to output.

Each of the subsequent modules 930, 932, and 934 process message content according to the content type. Each inspects the field members 302 HttpCmdType and HttpContentType of the field-set 301 and processes them if they correspond to their implementations. Otherwise the field-set 301 is dropped. Module 930 processes SOAP messages. Having processed the SOAP envelope from the message payload, it passes the XML body to module 940 which parses XML to extract the elements, attributes, and their values.

For example, consider a particular application employing HTTP/SOAP/XML messages that exchanges simple request-response pairs of such messages. Within the XML, the requests are encoded with a request type and a request ID element such as <Request>060</Request> and <RequestID>AZ45501-000</RequestID> and the responses with a response type and a response ID element such as <Response>060</Response> and <Response ID>AZ45501-001</Response ID>. In extracting the XML from the message payload of a given field-set 301, module 940 creates new field members 302 such as the following: RequestType="SOAP-XML:Req012"; SoapMsgRequestCmd=060; and, SoapMsgRequestId="AZ45501-000". The subsequent field-sets 301 are augmented with the generated field members 302 and send to output. The subsequent module 950 checks for completeness of the field-sets 302 and performs a sanity check. The field-sets 301 are then sent to output 97 and forwarded to the next stage 122.

Figure 11:
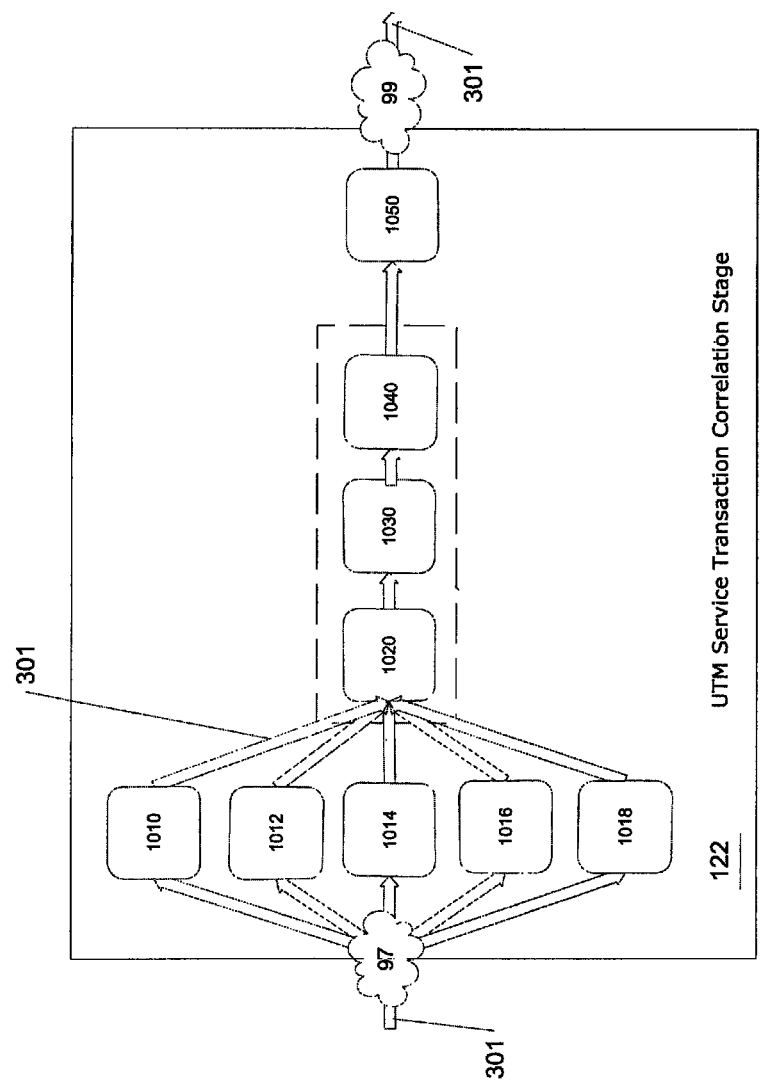
FIG. 11 is a block diagram illustrating operations of modules within an exemplary UTM service transaction correlation stage in accordance with an embodiment of the invention.

FIG. 11 is a block diagram illustrating operations of modules (e.g., 1010, 1020, 331) within an exemplary UTM service transaction correlation stage 122 in accordance with an embodiment of the invention. The subsequent stage 122 correlates the individual application message field-sets 301 together and generates new field-sets 301 corresponding to service-level transactions 26.

For a particular pair of nodes employing HTTP/SOAP/XML messages, for example, the corresponding types of request and response may have: the same type number; the response ID value may be identical and unique in the first 7 alphanumeric characters; requests may always have a field member SoapMsgRequestId ending with a 3 digit integer value of 000; the one or more responses to the request may have a field member SoapMsgRequestId that ends with a 3 digit integer value of 001 to 999, depending on their sequential order as a response; and, the final response message may always use the 3 digit value 999.

For each type of application message exchange, there may be a different known correspondence between messages exchanged, including a unique definition of what messages exchanged constitute a service transaction 26. Stage 122 may begin with a set of modules 1010, 1012, 1014, 1016, and 1018, each of which implements an analysis according to a particular known type of application message exchange and related definition(s) of service transaction 26. Each module identifies messages according to their position in a known sequence of messages.

Module 1010 may implement a sequence analysis for exchanges of HTTP/SOAP/XML messages. It may be configured at least for the previously described application message exchange. It identifies field-sets 301 bearing SoapMsgRequestType with any valid value (e.g., 060) as the first message in a sequence of messages that define a specific type of service transaction 26. Further, it maps application protocol specific field-names 303 to generic field-members 302 that are used by subsequent modules. For example, it generates field members 302 such as SoapMsgSeqType="SOAP-XML:Seq03", SoapMsgSeqPos="Begin", RequestCmd=060, RequestId="AZ45501-000", and MsgSeqPos="Begin" and adds them to the field-set 301. Similarly, it generates SoapMsgSeqType="End" for messages with field member 302 SoapMsgResponseId with a value 304 ending in 999. Field-sets 301 are passed to output.

The subsequent module 1020 identifies messages that represent the beginning of a new transaction and generates a corresponding field-set 301. For example, upon receiving a field-set 301, module 1020 checks if RequestType is present, then it inspects MsgSeqPos, RequestCmd and RequestId. If MsgSeqPos is "Start", a new field-set 301 is generated corresponding to a service transaction 26 with field members 302 derived from the application message field-set 301. A new field-set type is created with field member TransType="ServTrans", certain field members 302 derived from the correlated application message field-sets 301 are added such as the following: IpSrcAddress (source is where the request originated); IpDstAddress; TcpSrcPort; TcpDstPort; RequestType; RequestId; NumResponses; and, UUID. Both application message and service transaction field-sets 301 are passed to output.

The subsequent module 1030 receives both field-sets 301 and implements a correlation analysis based on patterns such as regular expressions. The patterns may be based on the absence or presence of particular field member 302 names 303, their values 304, and a variety of operations on either. It inspects RequestType and RequestId and other field members 302 of the application message field-set 301 and selects an appropriate matching function. As subsequent application message field-sets 301 arrive, it applies the matching function to determine if they are part of the expected set of messages constituting a specific transaction.

For example, if a subsequent application message field-set 301 arrives with field members 302 such that the LinkName, PortPair and ApplicationProtocol have the same value, LinkDirection and MsgType have opposing types, RequestType/Response Type are matching values, and the first 7 characters in the RequestId/ResponseId values are the same, then the field-sets 301 are considered to be correlated. If any additional field-sets 301 arrive, they are also compared to see if they correlate. The service transaction field-set 301 is held for a period of time and updated as additional messages are correlated with it. When a field-set 301 with MsgSeqPos="End" correlates with this service transaction 26, it is considered complete, a field member 302 ServLinkStatus is added with the value 304 "Complete", and passed to output.

Module 1030 also adds a field member 302 ParentUUID with a value 304 being the same as the UUID value of the service transaction field-set 301 to each of the correlated application message field-sets 301. Similar to link transactions 24, in cases where module 1030 times out waiting, the field member 302 ServLinkStatus is marked "Incomplete".

The subsequent module 1040 further analyzes the service transaction field-set 301 and its constituents. Variations of message implementation, message content, and message sequence are detected in the service transaction field-set 301. Known conditions and behaviours such as repeated requests, refused responses, and non-standard messages are identified and corresponding field members 302 added or updated. Field-sets 301 are then sent to output.

The subsequent module 1050 checks for completeness and performs a sanity check on the resulting field-sets 301 which are then output 99. Stage 122 is the final stage of the service layer 103.

Referring to FIG. 2, the subsequent application layer 105 includes a stage 130 that correlates service transaction field-sets 301 corresponding to joint transactions 27 according to a service topology model and a stage 132 that further correlates service transaction field-sets 301 corresponding to end-to-end application transactions 28. The service topology model 130 describes the function of each node (as shown in FIG. 5 for example), which nodes are connected to another, and the dependencies between nodes such that a transaction between two specific nodes may result in a transaction between an adjoining pair. The implemented model at this stage 130 generates joint transaction field-sets 301 derived from two or more service transactions 26 on adjoining service links. The joint transaction field-sets 301 are sent to the next stage 132.

The subsequent stage 132 correlates the field-sets 301 of adjoining transactions according to an end-user application model. The end-user application model identifies nodes where end-users interact with user interfaces, initiate transactions corresponding to application functionality, and changes in user interface state. The modules of this stage generate application transaction field-sets 301 that correspond to end-to-end application transactions 28. The application transaction field-sets 301 are derived from one or more joint transaction field-sets 301 that correspond to joint transactions 27.

The subsequent business layer 107 correlates application transaction field-sets 301 according to a business process model implemented in stage 140 and generates business tasks 29. The business process model 140 identifies the correspondence between the occurrence of application transactions 28 and steps taken toward achieving a business objective. The resulting correspondence maps sets of one or more application transactions 28 into business tasks 29 as part of one or more business processes. The subsequent stage 142 implements a business transaction model that correlates sets of business tasks 29, as well as with other non-transaction related information provided as part of the business layer, to generate business transactions 30. This layer 107 correlates application transactions from one or more end-user applications according to the business process model 140 and business transaction model 142 and generates business transaction field-sets 301 derived from one or more application transaction field-sets 301. The business models 140, 142 may also link other information and sources of data with the application transactions.

In each stage of each layer, a sequence 200 of modules implements the related semantic model(s) and incrementally analyzes the field-sets 301 passing through that layer. Each layer subsequently generates field-sets 301 specific to its layer that are passed onto the next layer. Each module in a given stage may augment or modify the set of field members 302 of a given field-set 301. The field members 302 used by a given module to perform its analysis may be generated by one or more preceding modules much earlier in the pipeline 200 and may have been used by other modules as well. Field-sets 301 and field members 302 that are no longer required may be dropped or deleted to reduce the overall movement and maintenance of data.

Thus, according to one embodiment, the present invention provides a method and system in which, first, semantic (functional and domain knowledge) models are applied in layers, describing the operation of a complex distributed application (e.g., 400). Second, models are implemented as sequences of configurable modules, each module representing an operational step in an analysis. Third, progressive and incremental analysis is performed, distributed along a sequence 200 of modules that are pipelined together. Fourth, overall analysis operates on network traffic to generate end-to-end application transactions 28 (or higher level, e.g., business transactions 29). Fifth, data from incremental analyses is passed module to module, along with data payloads from monitored network traffic, as discrete field-sets 301. Sixth, datasets are provided in the form of field-sets 301 which are dynamic collections of field members 302 (field 303/value 304 pairs) modified by each module as they pass along the pipeline 200. Seventh, field-sets 301 are held by a datastore 360, passed by reference along the pipeline 200, being dropped, deleted, created and modified by modules as required by the analysis. Eighth, types of field-sets 301 are provided, each corresponding to an implemented model layer and each being derived from other types of field-sets 301. Ninth, semantic information is derived at various points along the pipeline 200, carried as field-members 302 within a field-set 301, along with mechanical (syntactic) data also carried as field-members 302, and forwarded to downstream modules for subsequent processing in support of a final objective such as assembly, decoding, correlation, analytics, and alerting.

According to one embodiment, the present invention provides one or more of the following features. First, a layered approach to domain knowledge modeling expressed in terms, for example, of a UTM hierarchy 100 having network (connection and transport protocols), service (application protocols and implementation model), application (network/service topology and user interface), and business (business process and workflow) levels 101, 103, 105, 107 is provided. Second, linearized emulation of an "application stack" which may be expressed as a pipelined sequence 200 of functional modules and which performs operations and generates products in direct analogy to the operation of a distributed application 400 is provided. Third, models implemented piecewise across a plurality of modules are provided. Each module implements a single function (i.e., each is configurable with regard to the basic function). Each module has at least one input and one output. Each module has I/O based on sets of field members 302 (key-value pairs) or field-sets 301. Each module may add, remove or modify field members 302 from field-sets 301. Each module consumes field-sets 301, passes some output, and may generate new field-sets 301. Each module operates independently supporting scalability through parallelization. And, each module may be configured to share or monopolize computing resources (CPU 320, memory 330, I/O 350) to support its operation. Fourth, modules are assembled in a pipeline 200 to implement stages corresponding to models, with one or more stages composing a layer within a hierarchy 100 representing an application stack within a system 400. Each model processes field-sets 301 and passes them on to next module. A set of modules reproduces the operation of a given model within the overall application stack. Fifth, field members 302 that represent the results of progressive decodes, analyses, and semantic processing are provided. Dynamic sets of field members 302 (key-value pairs) comprising field-sets 301 are provided. Members of a field-set 301 are added, removed, or modified as they are passed along the module pipeline 200. Semantic and non-semantic operations on field members 302 are performed local to model implementations (i.e., functionality is brought to the data and a decentralized streaming implementation is provided). Sixth, field-sets are passed from module to module as references only (i.e., data corresponding to specific field-members 302 is selectively retrieved). Seventh, continuous operation on data 20 streamed from a network source (e.g., 314) is provided.

According to one embodiment, there is provided a method for correlating in real-time application messages 25 into application transactions 28 from the network traffic data 20 of a distributed network-connected application 400 comprising two or more nodes (e.g., 430, 431), comprising: two or more domain knowledge models that are composed hierarchically 100 to correspond to the operation of the distributed network-connected application 400; the two or more domain knowledge models are implemented as a sequence of pipelined modules such that each module performs a processing operation upon any inputs passed to it and passes the results as output to a subsequent module; the network traffic data 20 between the two or more nodes is passively monitored and passed as input to a first module for processing; the first module performs some first processing operation upon a part of the network traffic data 20, generating one or more associated field members 302 containing values 304 derived from the processed data, and subsequently passing unprocessed data and associated field members 302 as a field-set 301 to a second and subsequent module; a second and subsequent module receives the field-set 301 containing network data and associated field members 302, performs some second processing operation upon the network data and associated field members 302, modifying or deleting zero or more of the existing field members 302 from the field-set 301 and adding zero or more new field members 302 to the field-set 301, subsequently passing the field-set 301 to a subsequent module; and, a series of pipelined modules, comprising at least the first and second processing modules, passing field-sets 301 containing network data and associated field members 302 for processing from one module to the next according to the pipeline 200 until all operations have been performed upon the network data and field members 302 according to the operation of the two or more models as implemented within the pipeline 100 of modules. In this method, the two or more models may be at least an application protocol layered upon a network protocol. The two or more models may be a plurality of network protocols layered one atop another. The two or more models may be one or more network protocols, one or more application protocols, a service topology, and an application user model. A business model may be included in addition. Modules of a like kind may be pipelined in parallel to increase the throughput of the system at that point. Modules of a certain kind may be responsible for decoding the header of a given protocol. Modules of a certain kind may be responsible for associating network messages via analysis into a network transaction according to a network protocol. Modules of a certain kind may be responsible for assembling application messages 25 from the network transactions. Modules of a certain kind may be responsible for associating application messages 25 via analysis into a service transaction 26 according to an application protocol. Modules of a certain kind may be responsible for associating service transactions 26 via analysis into an application transaction 28 according to a network and/or service topology. And, modules of a certain kind may be responsible for associating application transactions 28 via analysis into a business transaction 29 according to a business process.

The above embodiments may contribute to an improved method and system and may provide one or more advantages. First, the provision of pipelined incremental processing and analysis supports real-time performance. Analysis is brought to the data instead of costly delivery of the data to a centralized analysis system. Incremental analysis is performed as data becomes available avoiding unnecessary storage and retrieval. Second, distributed processing provides for flexibility and scaling. The processing engine is not centralized but rather is distributed across multiple components (modules). Modularization of processing allows computing resources to be applied selectively to bottlenecks. Third, selective field member 302 retrieval by modules is provided which reduces data movement. Fourth, the method and system is optimized for real-time processing. In particular, the following are provided: horizontal scaling of like components; vertical scaling of unlike components; incremental filtering to reduce unnecessary processing; and, semantic analysis related to correlation is kept local to decode and filtering for efficiency which avoids redundant coding and limits the amount of data movement. Fifth, decoupling between layers of domain knowledge models is provided which supports flexibility of implementation and configuration, efficient re-use of modular code, and allows multiple equivalent models to be implemented in parallel. Sixth, the invention helps solve the massive fan-in problem by providing multiple input modules in parallel and multiple data sources that may be connected in parallel without a single point of entry acting as a bottleneck. Seventh, the invention allows for scaling with the implementation that is being modeled such that the requirement for more resources to monitor than to run an application is avoided.

Aspects of the above described method may be summarized with the aid of a flowchart.

Figure 13:
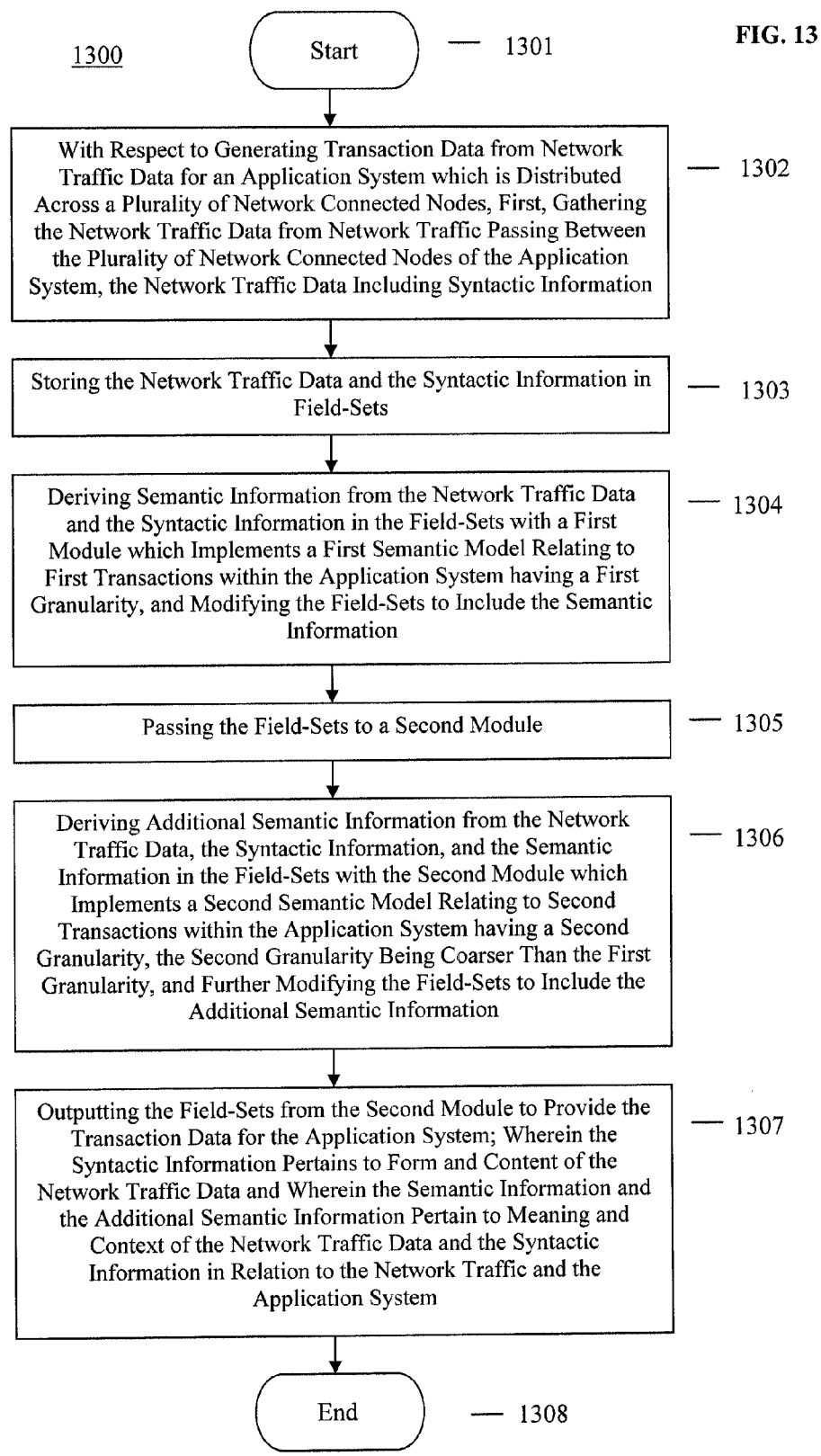

FIG. 13 is a flow chart illustrating operations 1300 of modules (e.g., 331) within a data processing system (e.g., 300) for generating transaction data from network traffic data 20 for an application system (e.g., 400) which is distributed across a plurality of network connected nodes (e.g., 430, 431), in accordance with an embodiment of the invention.

At step 1301, the operations 1300 start.

At step 1302, the network traffic data 20 is gathered from network traffic 10 passing between the plurality of network connected nodes 430, 431 of the application system 400, the network traffic data 20 including syntactic information (e.g., 305).

At step 1303, the network traffic data 20 and the syntactic information 305 are stored in field-sets 301.

At step 1304, semantic information 306 is derived from the network traffic data 20 and the syntactic information 305 in the field-sets 301 with a first module (e.g., 505) which implements a first semantic model (e.g., 110) relating to first transactions (e.g., 24) within the application system 400 having a first granularity, and the field-sets 301 are modified to include the semantic information 306.

At step 1305, the field-sets 301 are passed to a second module (e.g., 910).

At step 1306, additional semantic information (e.g., 306) is derived from the network traffic data 20, the syntactic information 305, and the semantic information 306 in the field-sets 301 with the second module 910 which implements a second semantic model (e.g., 120) relating to second transactions (e.g., 26) within the application system 400 having a second granularity, the second granularity being coarser than the first granularity, and the field-sets 301 are further modified to include the additional semantic information 306.

At step 1307, the field-sets 301 are output from the second module 910 to provide the transaction data (e.g., 301) for the application system 400, wherein the syntactic information 305 pertains to form and content of the network traffic data 20 and wherein the semantic information 306 and the additional semantic information 306 pertain to meaning and context of the network traffic data 20 and the syntactic information 305 in relation to the network traffic 10 and the application system 400.

At step 1308, the operations 1300 end.

In the above method, each field-set 301 may include one or more field members 302, wherein each field member 302 is a name-value pair 303, 304, and wherein the one or more field members 302 store the network traffic data 20, the syntactic information 305, the semantic information 306, and the additional semantic information 306. The modifying and the further modifying of the field-sets 301 may include one or more of: adding one or more field-sets 301; deleting one or more field-sets 301; combining one or more field-sets 301; filtering one or more field-sets 301; and, adding, deleting, or modifying one or more field members 302 of one or more field-sets 301. The first module 505 may be a first sequence of modules (e.g., 505, 510, 515, 520, 522, 524, 530) and the second module 910 may be a second sequence of modules (e.g., 910, 920, 926, 928, 930, 932, 934, 940, 950). The first module 505 and the second module 910 may form a pipeline 200 of modules. The field-sets 301 may be stored in a datastore 360 of a monitoring system 300 and references to the field-sets 301 may be passed between the first module 505 and the second module 910. The deriving of semantic information 306 and the deriving of the additional semantic information 306 may be distributed across the first sequence of modules 505, 510, 515, 520, 522, 524, 530 and the second sequence of modules 910, 920, 926, 928, 930, 932, 934, 940, 950, respectively, such that the deriving of the semantic information 306 and the deriving of the additional semantic information 360 proceeds incrementally as field-sets 301 are passed from module to module within the first sequence of modules 505, 510, 515, 520, 522, 524, 530 and from module to module within the second sequence of modules 910, 920, 926, 928, 930, 932, 934, 940, 950. The method may further include: generating a hierarchical model (e.g., 100) for the application system 400, the hierarchical model 100 having at least a first layer (e.g., 101) and a second layer (e.g., 103), the first layer 101 corresponding to the first transactions 24 and the second layer corresponding to the second transactions 26, the first module 505 and the first semantic model 110 being associated with the first layer 101 and the second module 910 and the second semantic model 120 being associated with the second layer 103; and, mapping the application system 400 onto the hierarchical model 100 according to a network topology 410 of the application system 400. The first transactions 24 may be link transactions 24, the second transactions 26 may be service transactions 26, the first layer 101 may be a network layer 101, and the second layer 103 may be a service layer 103. And, the transaction data (e.g., 301) may be used for monitoring the application system 400.

The method may further include: passing the field-sets 301 to one or more further modules; deriving further semantic information 306 from the network traffic data 20, the syntactic information 305, the semantic information 306, and the additional semantic information 306 in the field-sets 301 with the one or more further modules which implement one or more further semantic models (e.g., 130, 140) relating to one or more further transactions (e.g., 28, 30) within the application system 400 having one or more further granularities, respectively, the one or more further granularities being coarser than the second granularity, and still further modifying the field-sets 301 to include the further semantic information 306; and, outputting the field-sets 301 from the one or more further modules to provide the transaction data (e.g., 301) for the application system 400. The method may further include: generating a hierarchical model (e.g., 100) for the application system 400, the hierarchical model 100 having at least a first layer 101, a second layer 103, and one or more further layers (e.g., 105, 107), the first layer 101 corresponding to the first transactions 24, the second layer 103 corresponding to the second transactions 26, and the one or more further layers 105, 107 corresponding to the one or more further transactions 28, 30, the first module 505 and the first semantic model 110 being associated with the first layer 101, the second module 910 and the second semantic model 120 being associated with the second layer 103, and the one or more further modules and the one or more further semantic models 130, 140 being associated with the one or more further layers 105, 107; and, mapping the application system 400 onto the hierarchical model 100 according to a network topology 410 of the application system 400. Third transactions 28 of the one or more further transactions 28, 30 may be application transactions 28, fourth transactions 30 of the one or more further transactions 28, 30 may be business transactions 30, a third layer 105 of the one or more further layers 105, 107 may be an application layer 105, and a fourth layer 107 of the one or more further layers 105, 107 may be a business layer 107. The first module 505 may be a first sequence of modules 505, 510, 515, 520, 522, 524, 530, the second module 910 may be a second sequence of modules 910, 920, 926, 928, 930, 932, 934, 940, 950, and the one or more further modules may be one or more further sequences of modules. The first module 505, the second module 910, and the one or more further modules may form a pipeline 200 of modules. The field-sets 301 may be stored in a datastore 360 of a monitoring system 300 and references to the field-sets 301 may be passed between the first module 505, the second module 910, and the one or more further modules. The deriving of semantic information 306, the deriving of the additional semantic information 306, and the deriving of the further semantic information 306 may be distributed across the first sequence of modules 505, 510, 515, 520, 522, 524, 530, the second sequence of modules 910, 920, 926, 928, 930, 932, 934, 940, 950, and the one or more further sequences of modules, respectively, such that the deriving of the semantic information 306, the deriving of the additional semantic information 306, and the deriving of the further semantic information 360 proceeds incrementally as field-sets 301 are passed from module to module within the first sequence of modules 505, 510, 515, 520, 522, 524, 530, from module to module within the second sequence of modules 910, 920, 926, 928, 930, 932, 934, 940, 950, and from module to module within the one or more further sequences of modules. The first module 505 and the second module 910 may be one or more of software and hardware modules 331, 321. The first module 505, the second module 910, and the one or more further modules may be one or more of software and hardware modules 331, 321. And, the application system 400 may be a financial or banking system.

According to one embodiment, each of the above steps 1301-1308 may be implemented by a respective software module 331. According to another embodiment, each of the above steps 1301-1308 may be implemented by a respective hardware module 321. According to another embodiment, each of the above steps 1301-1308 may be implemented by a combination of software 331 and hardware modules 321.

While this invention is primarily discussed as a method, a person of ordinary skill in the art will understand that the apparatus discussed above with reference to a data processing system 300 may be programmed to enable the practice of the method of the invention. Moreover, an article of manufacture for use with a data processing system 300, such as a pre-recorded storage device or other similar computer readable medium or computer program product including program instructions recorded thereon, may direct the data processing system 300 to facilitate the practice of the method of the invention. It is understood that such apparatus, products, and articles of manufacture also come within the scope of the invention.

In particular, the sequences of instructions which when executed cause the method described herein to be performed by the data processing system 300 can be contained in a data carrier product according to one embodiment of the invention. This data carrier product can be loaded into and run by the data processing system 300. In addition, the sequences of instructions which when executed cause the method described herein to be performed by the data processing system 300 can be contained in a computer software product or computer program product according to one embodiment of the invention. This computer software product or computer program product can be loaded into and run by the data processing system 300. Moreover, the sequences of instructions which when executed cause the method described herein to be performed by the data processing system 300 can be contained in an integrated circuit product (e.g., a hardware module or modules 321) which may include a coprocessor or memory according to one embodiment of the invention. This integrated circuit product can be installed in the data processing system 300.

The embodiments of the invention described above are intended to be exemplary only. Those skilled in the art will understand that various modifications of detail may be made to these embodiments, all of which come within the scope of the invention.

What is claimed is:

1. A method for monitoring an application system which is distributed across a plurality of network connected nodes by generating transaction data from network traffic data for the application system, comprising:

gathering the network traffic data directly from network traffic passing between the plurality of network connected nodes of the application system, the network traffic data including syntactic information;

storing the network traffic data and the syntactic information in field-sets;

deriving semantic information from the network traffic data and the syntactic information in the field-sets with a first module which implements a first semantic model relating to first transactions within the application system having a first granularity, and modifying the field-sets to include the semantic information;

generating one or more new field sets populated with field members derived from analysis of one or more existing field sets of the field sets and adding the one or more new field sets to the field sets, wherein at least one of the one or more new field sets refers to at least one second transaction of second transactions within the application system having a second granularity, and wherein the one or more new field sets and the one or more existing field sets are of a same form;

assigning respective first universally unique identifiers to field members of each of the one or more existing field sets, assigning respective second universally unique identifiers to field members of each of the one or more new field sets, and including the second universally unique identifiers in respective field members of each of the one or more existing field sets;

passing the field-sets to a second module;

deriving additional semantic information from the network traffic data, the syntactic information, and the semantic information in the field-sets with the second module which implements a second semantic model relating to the second transactions within the application system having the second granularity, the second granularity being coarser than the first granularity, and further modifying the field-sets to include the additional semantic information; and, outputting the field-sets from the second module to provide the transaction data for the application system;

wherein the syntactic information pertains to form and content of the network traffic data and wherein the semantic information and the additional semantic information pertain to meaning and context of the network traffic data and the syntactic information in relation to the network traffic and the application system;

wherein the first transactions correspond to a first layer of a hierarchical model for the application system, wherein the second transactions correspond to a second layer of the hierarchical model, wherein the first module and the first semantic model are associated with the first layer, wherein the second module and the second semantic model are associated with the second layer, wherein the first transactions are link transactions, wherein the second transactions are service transactions, wherein the first layer is a network layer, and wherein the second layer is a service layer.

2. The method of claim 1 wherein each field-set includes one or more field members, wherein each field member is a name-value pair, and wherein the one or more field members store the network traffic data, the syntactic information, the semantic information, and the additional semantic information.

3. The method of claim 1 wherein the modifying and the further modifying of the field-sets includes one or more of: adding one or more field-sets; deleting one or more field-sets; combining one or more field-sets; filtering one or more field-sets; and, adding, deleting, or modifying one or more field members of one or more field-sets.

4. The method of claim 1 wherein the first module is a first sequence of modules and wherein the second module is a second sequence of modules.

5. The method of claim 1 wherein the first module and the second module form a pipeline of modules.

6. The method of claim 1 wherein the field-sets are stored in a datastore of a monitoring system and wherein references to the field-sets are passed between the first module and the second module.

7. The method of claim 4 wherein the deriving of semantic information and the deriving of the additional semantic information is distributed across the first sequence of modules and the second sequence of modules, respectively, such that the deriving of the semantic information and the deriving of the additional semantic information proceeds incrementally as field-sets are passed from module to module within the first sequence of modules and from module to module within the second sequence of modules.

8. The method of claim 1 and further comprising:
generating the hierarchical model for the application system, the hierarchical model having at least the first layer and the second layer; and,
mapping the application system onto the hierarchical model according to a network topology of the application system.

9. The method of claim 1 wherein the transaction data is used for monitoring the application system.

10. The method of claim 1 and further comprising:
passing the field-sets to one or more further modules;
deriving further semantic information from the network traffic data, the syntactic information, the semantic information, and the additional semantic information in the field-sets with the one or more further modules which implement one or more further semantic models relating to one or more further transactions within the application system having one or more further granularities, respectively, the one or more further granularities being coarser than the second granularity, and still further modifying the field-sets to include the further semantic information; and, outputting the field-sets from the one or more further modules to provide the transaction data for the application system.

11. The method of claim 10 and further comprising:
generating the hierarchical model for the application system, the hierarchical model having at least the first layer, the second layer, and one or more further layers, the one or more further layers corresponding to the one or more further transactions, and the one or more further modules and the one or more further semantic models being associated with the one or more further layers; and,
mapping the application system onto the hierarchical model according to a network topology of the application system.

12. The method of claim 11 wherein third transactions of the one or more further transactions are application transactions, fourth transactions of the one or more further transactions are business transactions, a third layer of the one or more further layers is an application layer, and a fourth layer of the one or more further layers is a business layer.

13. The method of claim 10 wherein the first module is a first sequence of modules, wherein the second module is a second sequence of modules, and wherein the one or more further modules are one or more further sequences of modules.

14. The method of claim 13 wherein the deriving of semantic information, the deriving of the additional semantic information, and the deriving of the further semantic information is distributed across the first sequence of modules, the second sequence of modules, and the one or more further sequences of modules, respectively, such that the deriving of the semantic information, the deriving of the additional semantic information, and the deriving of the further semantic information proceeds incrementally as field-sets are passed from module to module within the first sequence of modules, from module to module within the second sequence of modules, and from module to module within the one or more further sequences of modules.

15. The method of claim 10 wherein the first module, the second module, and the one or more further modules form a pipeline of modules.

16. The method of claim 10 wherein the field-sets are stored in a datastore of a monitoring system and wherein references to the field-sets are passed between the first module, the second module, and the one or more further modules.

17. The method of claim 10 wherein the first module, the second module, and the one or more further modules are one or more of software and hardware modules.

18. The method of claim 1 wherein the first module and the second module are one or more of software and hardware modules.

19. The method of claim 1 wherein the application system is a financial or banking system.

20. The method of claim 1 and further comprising, prior to the outputting of the field-sets from the second module to provide the transaction data for the application system, dropping field-sets relating only to the first transactions from the field-sets.

21. A system for monitoring an application system which is distributed across a plurality of network connected nodes by generating transaction data from network traffic data for the application system, comprising:
a processor coupled to memory and an interface to the network; and, at least one of hardware and software modules within the memory and controlled or executed by the processor, the modules including:
a module for gathering the network traffic data directly from network traffic passing between the plurality of network connected nodes of the application system, the network traffic data including syntactic information;
a module for storing the network traffic data and the syntactic information in field-sets;
a module for deriving semantic information from the network traffic data and the syntactic information in the field-sets with a first module which implements a first semantic model relating to first transactions within the application system having a first granularity, and modifying the field-sets to include the semantic information;
a module for generating one or more new field sets populated with field members derived from analysis of one or more existing field sets of the field sets and adding the one or more new field sets to the field sets, wherein at least one of the one or more new field sets refers to at least one second transaction of second transactions within the application system having a second granularity, and wherein the one or more new field sets and the one or more existing field sets are of a same form;
a module for assigning respective first universally unique identifiers to field members of each of the one or more existing field sets, assigning respective second universally unique identifiers to field members of each of the one or more new field sets, and including the second universally unique identifiers in respective field members of each of the one or more existing field sets;
a module for passing the field-sets to a second module;
a module for deriving additional semantic information from the network traffic data, the syntactic information, and the semantic information in the field-sets with the second module which implements a second semantic model relating to the second transactions within the application system having the second granularity, the second granularity being coarser than the first granularity, and further modifying the field-sets to include the additional semantic information; and,
a module for outputting the field-sets from the second module to provide the transaction data for the application system;
wherein the syntactic information pertains to form and content of the network traffic data and wherein the semantic information and the additional semantic information pertain to meaning and context of the network traffic data and the syntactic information in relation to the network traffic and the application system;
wherein the first transactions correspond to a first layer of a hierarchical model for the application system, wherein the second transactions correspond to a second layer of the hierarchical model, wherein the first module and the first semantic model are associated with the first layer, wherein the second module and the second semantic model are associated with the second layer, wherein the first transactions are link transactions, wherein the second transactions are service transactions, wherein the first layer is a network layer, and wherein the second layer is a service layer.

22. The system of claim 21 and further comprising, a module for, prior to the outputting of the field-sets from the second module to provide the transaction data for the application system, dropping field-sets relating only to the first transactions from the field-sets.

* * * * *